US012811325B2

(12) United States Patent
Tanaka

(10) Patent No.: US 12,811,325 B2
(45) Date of Patent: Nov. 24, 2026

(54) FLOATING CONNECTOR

(71) Applicant: SMK Corporation, Tokyo (JP)

(72) Inventor: Yuki Tanaka, Kanagawa (JP)

(73) Assignee: SMK Corporation, Tokyo (JP)

( * ) Notice: Subject to any disclaimer, the term of this patent is extended or adjusted under 35 U.S.C. 154(b) by 372 days.

(21) Appl. No.: 18/582,465

(22) Filed: Feb. 20, 2024

(65) Prior Publication Data

US 2025/0087921 A1 Mar. 13, 2025

(30) Foreign Application Priority Data

Sep. 7, 2023 (JP) ................................ 2023-145481

(51) Int. Cl.
*H01R 12/91* (2011.01)
*H01R 12/70* (2011.01)
*H01R 13/11* (2006.01)
*H01R 101/00* (2006.01)

(52) U.S. Cl.
CPC ......... *H01R 12/91* (2013.01); *H01R 12/7023* (2013.01); *H01R 13/113* (2013.01); *H01R 2101/00* (2013.01)

(58) Field of Classification Search
None
See application file for complete search history.

(56) References Cited

U.S. PATENT DOCUMENTS 6,089,880 A * 7/2000 Miyagawa ............ H01R 13/11 439/82
6,193,567 B1 * 2/2001 Hsieh .................... H01R 12/58 439/853
2016/0294089 A1 10/2016 Kobayashi
2023/0411885 A1 * 12/2023 Fu ......................... H01R 12/58

FOREIGN PATENT DOCUMENTS

JP S60183374 U 12/1985
JP H0217416 Y2 5/1990
JP H11339906 A 12/1999
JP 5849166 B1 1/2016
JP 7060153 B1 4/2022
WO 2010055752 A1 5/2010

* cited by examiner

*Primary Examiner* — Ross N Gushi

(57) ABSTRACT

A connector to be mounted on a circuit substrate and formed by a metal plate that connects a conductive part of the circuit substrate and a plug includes: a frame-shaped frame body part including an upper aperture part, a lower aperture part, an upper-end aperture edge part provided around the upper aperture part, and a lower-end aperture edge part provided around the lower aperture part; a pair of connection parts provided to extend from the lower-end aperture edge part toward an inside of the frame body part and toward the upper-end aperture edge part and to be connected to the plug; a pair of fixed parts that are fixed and connected to the conductive part; and a pair of floating parts that connect the frame body part to the pair of fixed parts, respectively, and support the frame body part so that the frame body part is freely movable.

15 Claims, 36 Drawing Sheets

FLOATING CONNECTOR

CROSS-REFERENCE TO RELATED APPLICATIONS

This application claims the priority benefit under 35 U.S.C. § 119 of Japanese Patent Application No. 2023-145481 filed on Sep. 7, 2023, which is hereby incorporated in its entirety by reference.

FIELD

The present invention relates to a connector mounted on a circuit substrate and formed, as a single unit, by a metal plate that connects a conductive part of the circuit substrate and a mating conductor.

BACKGROUND

As a connector to be mounted on a substrate, a substrate-mounted connector disclosed in Patent Literature 1 has conventionally been known. The substrate-mounted connector in Patent Literature 1 includes legs for surface mounting, and these legs are suspended from four corners of a substantially rectangular mating surface in which an aperture is formed. The substrate-mounted connector in Patent Literature 1 also includes a contact part formed of contact pieces that extend from the outside of the mating surface in an inner downward direction so as to face each other, and also includes a guide part formed so as to incline downward at the inner edge of the aperture. In the substrate-mounted connector in Patent Literature 1, when a tab terminal to be inserted is slightly displaced, the guide part guides the tab terminal and when the tab terminal is considerably displaced, the tab terminal comes into contact with the mating surface, so that deformation of the contact pieces is prevented.

However, according to Patent Literature 1, when the tab terminal is considerably displaced in the direction of the elastic deformation of the contact pieces while the tab terminal is in contact with the contact part, the legs suspending from the four corners of the mating surface receive a load through the contact pieces. This causes a problem that a solder, which connects connection parts at the tip of the legs to a connection circuit, is detached and electrical connection between the connection parts and the connection circuit is disrupted. Patent Literature 1 also has a problem that the connection between the tab terminal and the contact pieces becomes unstable when the tab terminal is considerably displaced in the direction of the elastic deformation of the contact pieces while the tab terminal is in contact with the contact part.

SUMMARY

An object of the present invention is to provide a connector capable of maintaining an electrically stable connection even when displacement of a mating conductor occurs while the connector is being connected to the mating conductor or after such a connection is established.

One aspect according to the present invention is a connector to be mounted on a circuit substrate and formed, as a single unit, by a metal plate that connects a conductive part of the circuit substrate and a mating conductor, the connector including: a frame-shaped frame body part including an upper aperture part, a lower aperture part, an upper-end aperture edge part provided around the upper aperture part, and a lower-end aperture edge part provided around the lower aperture part; a pair of connection parts provided so as to extend from the lower-end aperture edge part toward an inside of the frame body part and toward the upper-end aperture edge part and to be connected to the mating conductor; a pair of fixed parts that are fixed and connected to the conductive part; and a pair of floating parts that connect the frame body part to the pair of fixed parts, respectively, and support the frame body part so that the frame body part is freely movable.

Another aspect according to the present invention is a connector to be mounted on a circuit substrate and formed, as a single unit, by a metal plate that connects a conductive part of the circuit substrate and a mating conductor, the connector including: a frame-shaped frame body part including an upper aperture part, a lower aperture part, an upper-end aperture edge part provided around the upper aperture part, and a lower-end aperture edge part provided around the lower aperture part; a pair of connection parts provided so as to extend from the upper-end aperture edge part toward an inside of the frame body part and toward the lower-end aperture edge part and to be connected to the mating conductor; a pair of fixed parts that are fixed and connected to the conductive part; a pair of buckling suppression parts provided so as to extend from the lower-end aperture edge part toward an inside of the frame body part and toward the upper-end aperture edge part and to cover a lower end portion of the pair of connection parts; and a pair of floating parts that connect the lower-end aperture edge part to the pair of fixed parts, respectively, and support the frame body part so that the frame body part is freely movable.

When the mating conductor is displaced with respect to the connector when the connection is being established or after the establishment of a connection between the mating conductor and the connection parts, the pair of connection parts moves to the connection position with the mating conductor, so that the pair of floating parts elastically deforms by following the movement of the pair of connection parts, and the frame body part also moves to a connection position of the mating conductor with the connection parts. These actions maintain the state of connection between the pair of connection parts and the mating conductor provided in the case where the mating conductor is not displaced with respect to the connector.

The connector according to the aspect(s) of the present invention is capable of maintaining an electrically stable connection, even when displacement of a mating conductor occurs while the connector is being connected to the mating conductor or after such a connection is established.

BRIEF DESCRIPTION OF DRAWINGS

These and other characteristics, features, and advantages of the aspect(s) of the present invention will become clear from the following description with reference to the accompanying drawings, wherein.

DESCRIPTION OF INVENTION

Figure 1:
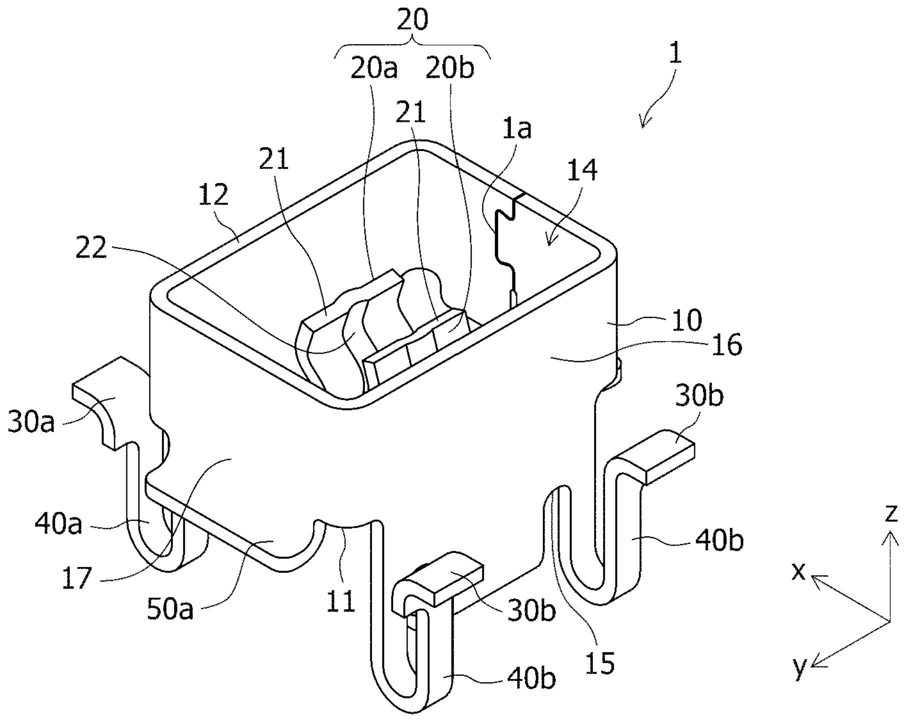
FIG. 1 is a perspective view of a connector according to a first embodiment of the present invention, when viewed from above.
Figure 2:
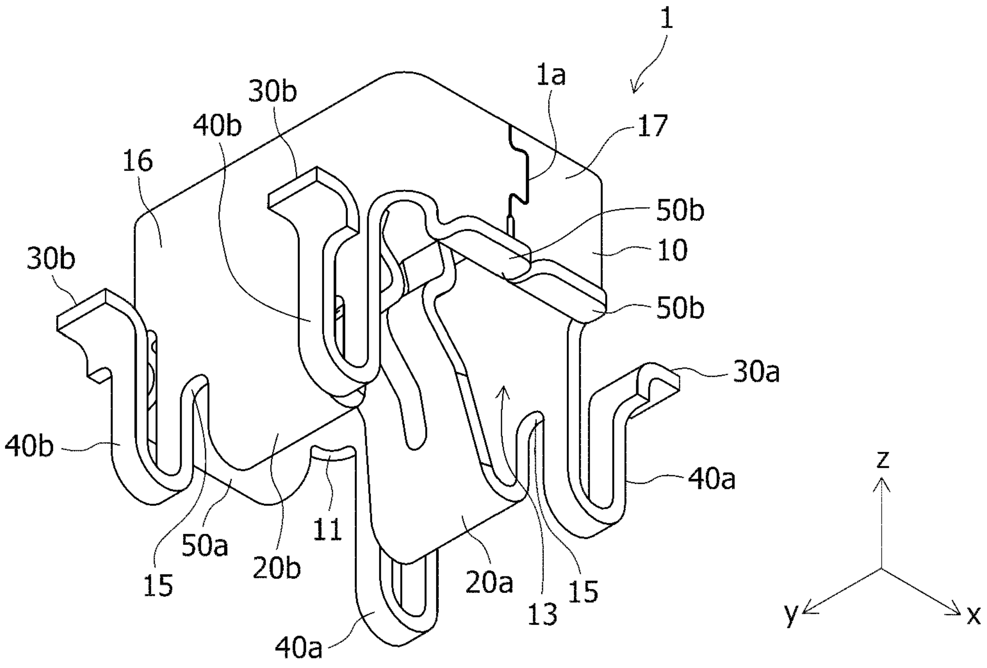
FIG. 2 is a perspective view of the connector according to the first embodiment of the present invention, when viewed from below.
Figure 3:
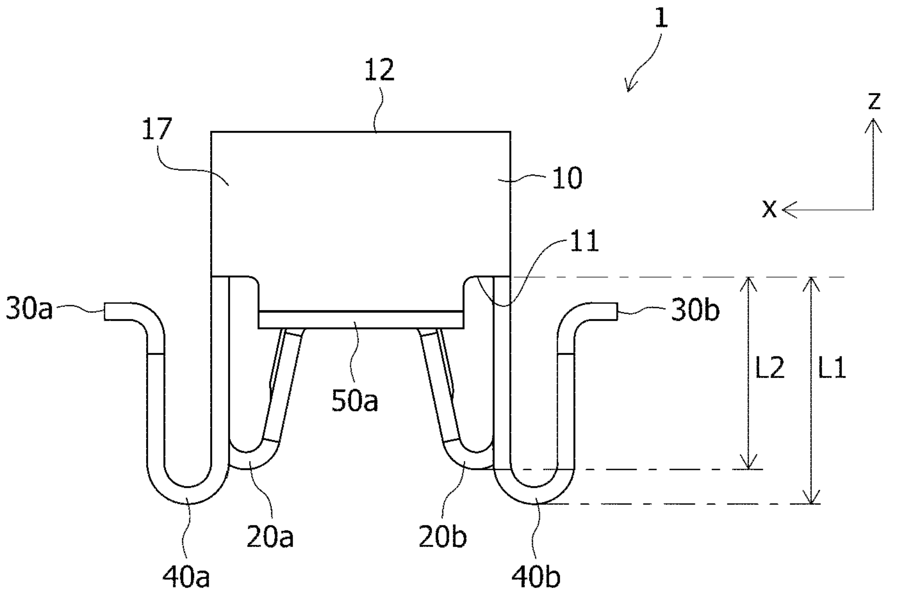
FIG. 3 is an elevation view of the connector according to the first embodiment of the present invention.
Figure 4:
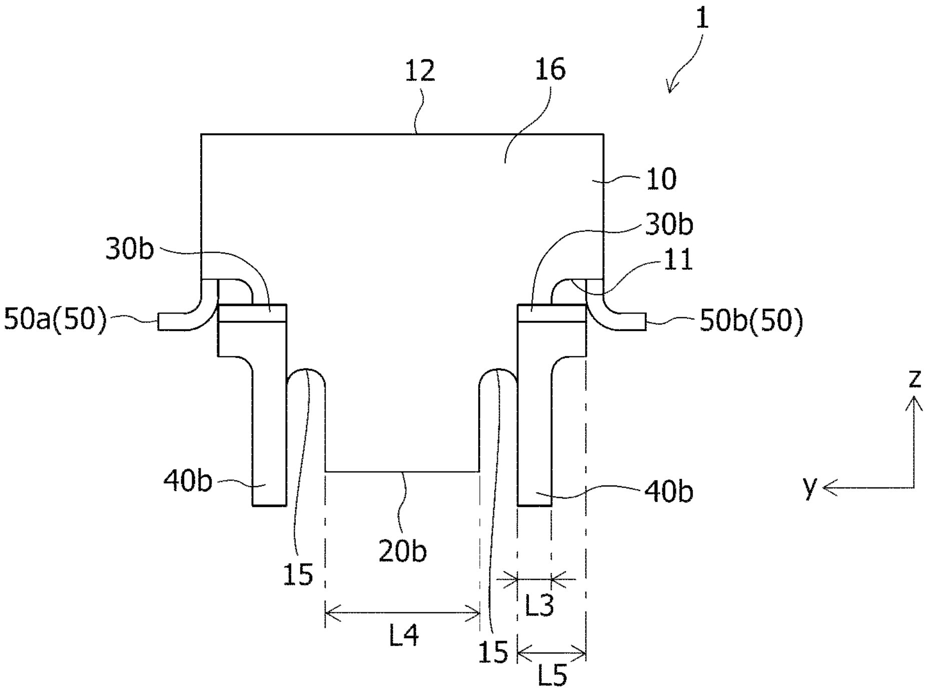
FIG. 4 is a side view of the connector according to the first embodiment of the present invention.
Figure 5:
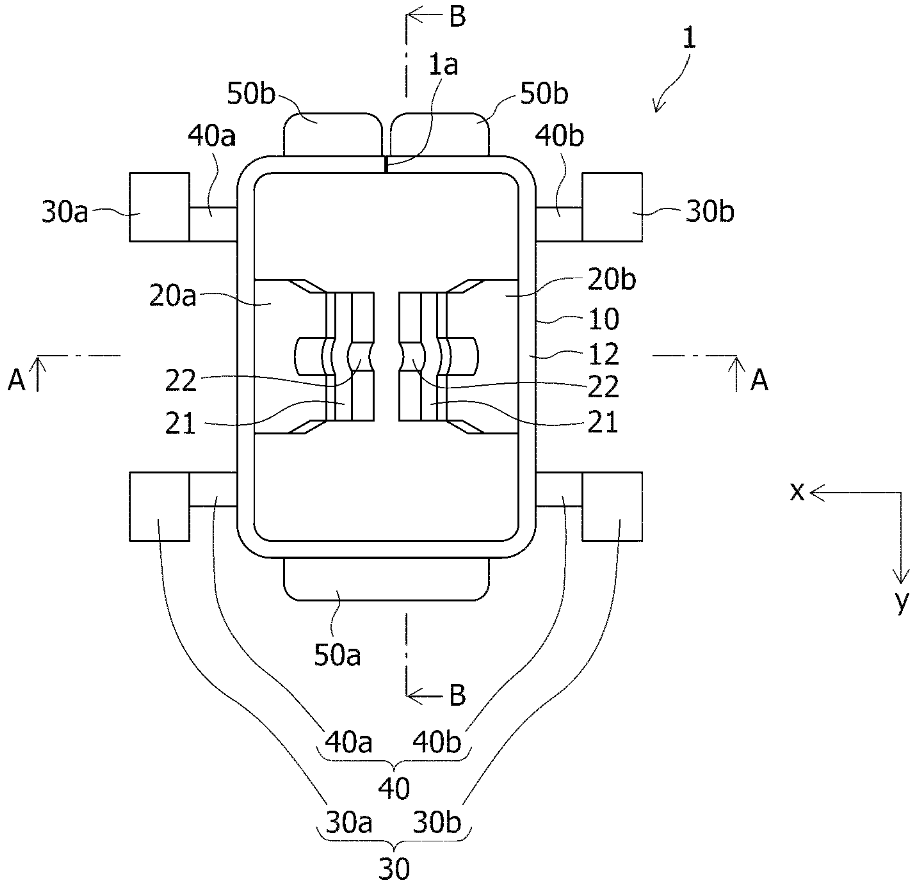
FIG. 5 is a plan view of the connector according to the first embodiment of the present invention.
Figure 6:
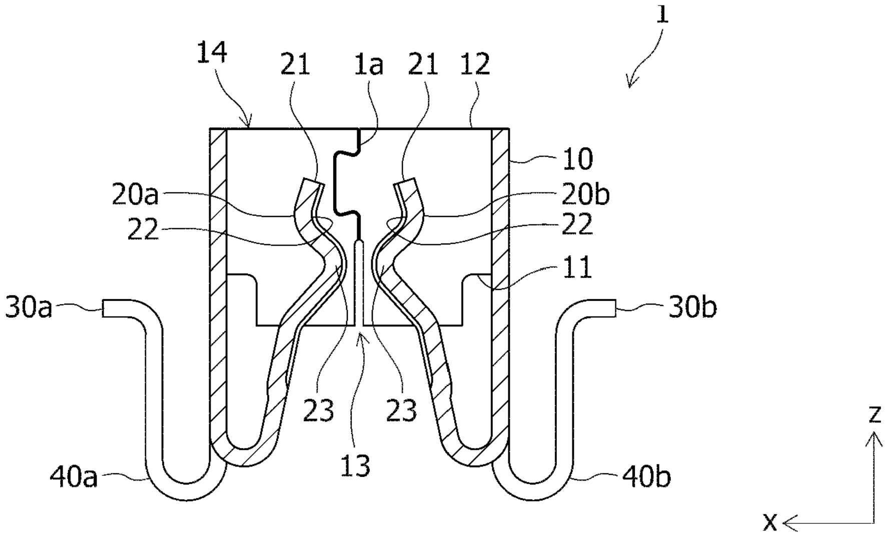
FIG. 6 is a cross-sectional view of the connector taken along line A-A in FIG. 5.
Figure 7:
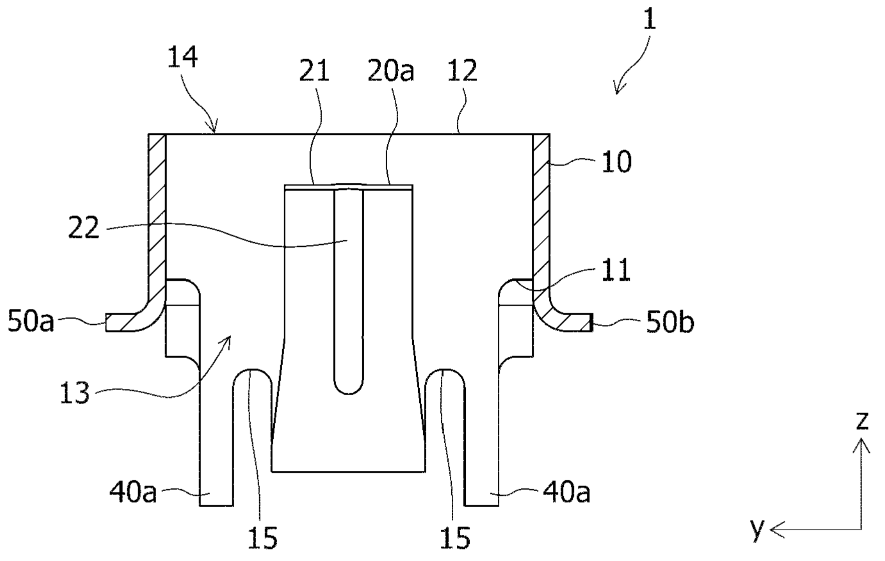
FIG. 7 is a cross-sectional view of the connector taken along line B-B in FIG. 5.
Figure 8:
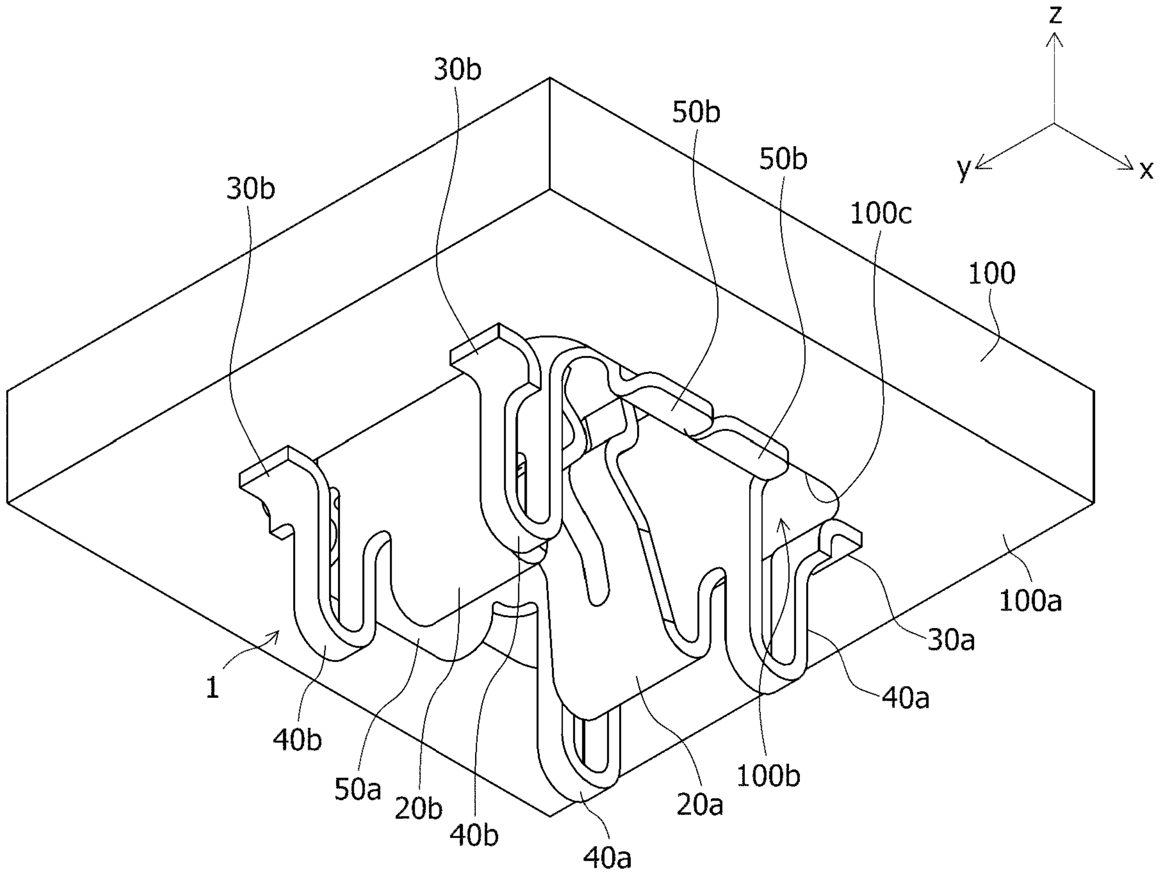
FIG. 8 is a perspective view of the connector according to the first embodiment of the present invention, when viewed from below, in a state of being mounted on a circuit substrate.
Figure 9:
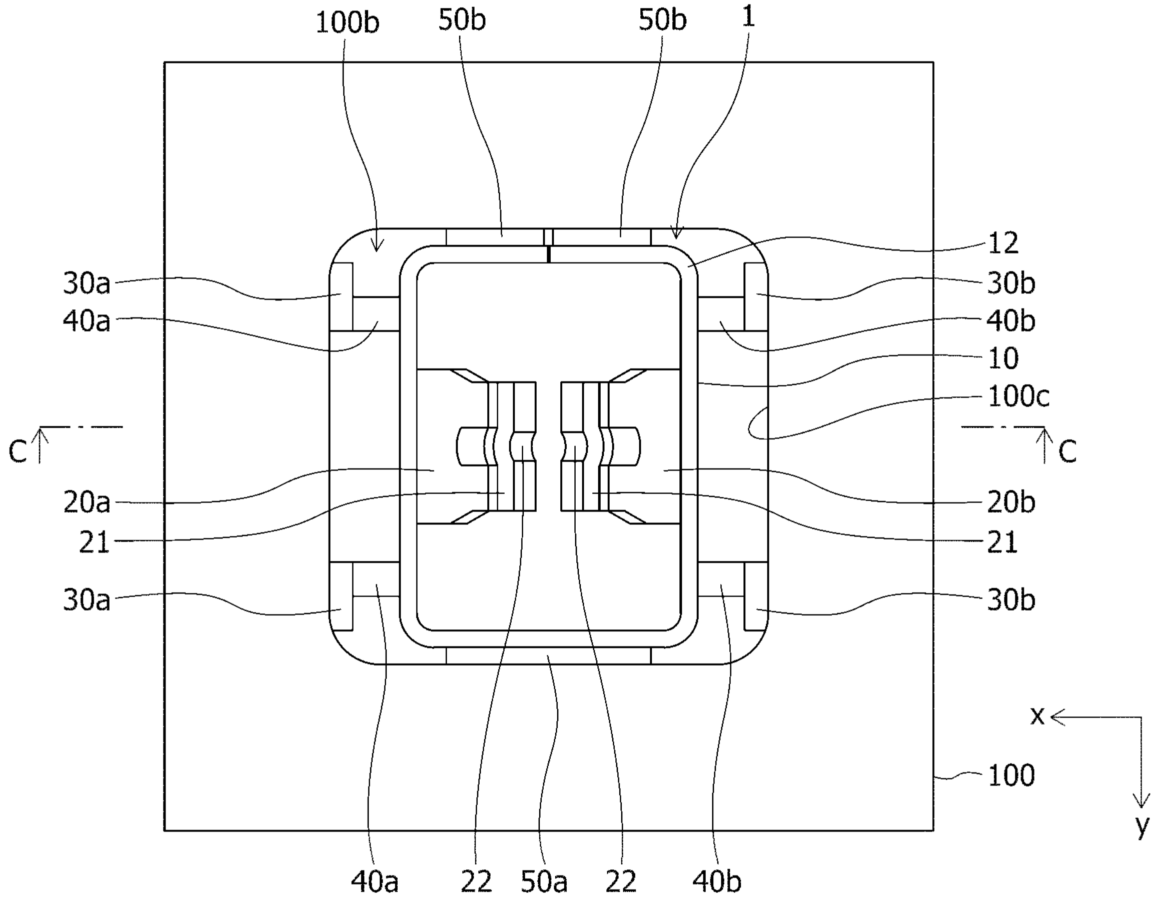
FIG. 9 is a plan view of the connector according to the first embodiment of the present invention in the state of being mounted on the circuit substrate.
Figure 10:
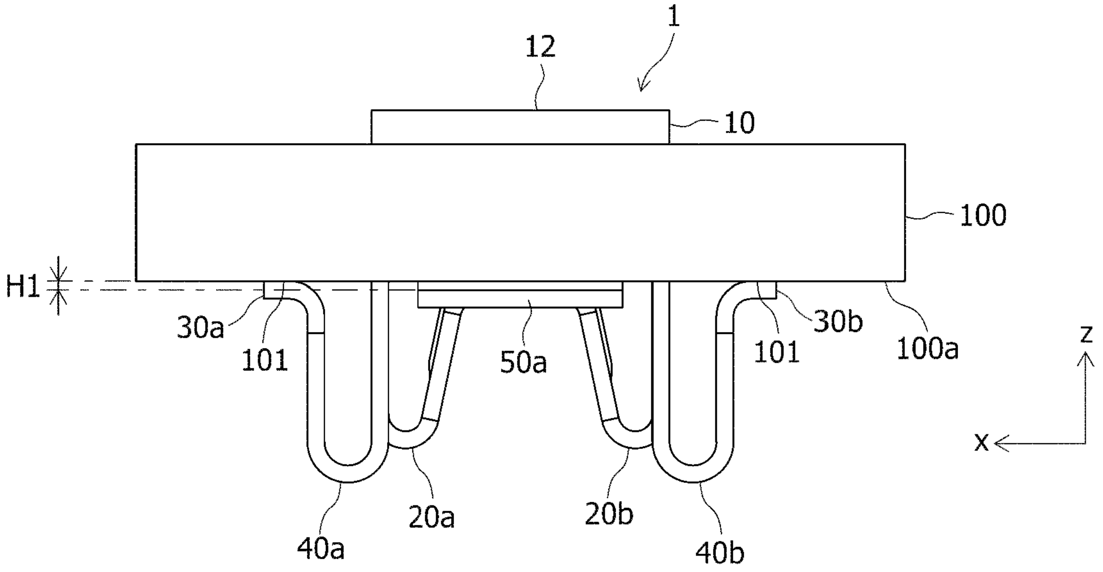
FIG. 10 is an elevation view of the connector according to the first embodiment of the present invention in the state of being mounted on the circuit substrate.
Figure 11:
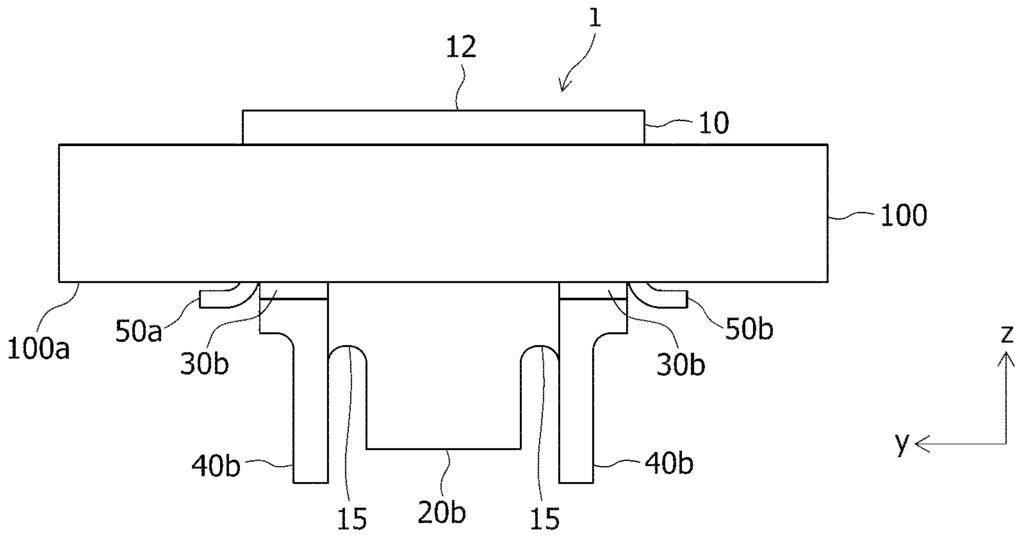
FIG. 11 is a side view of the connector according to the first embodiment of the present invention in the state of being mounted on the circuit substrate.
Figure 12:
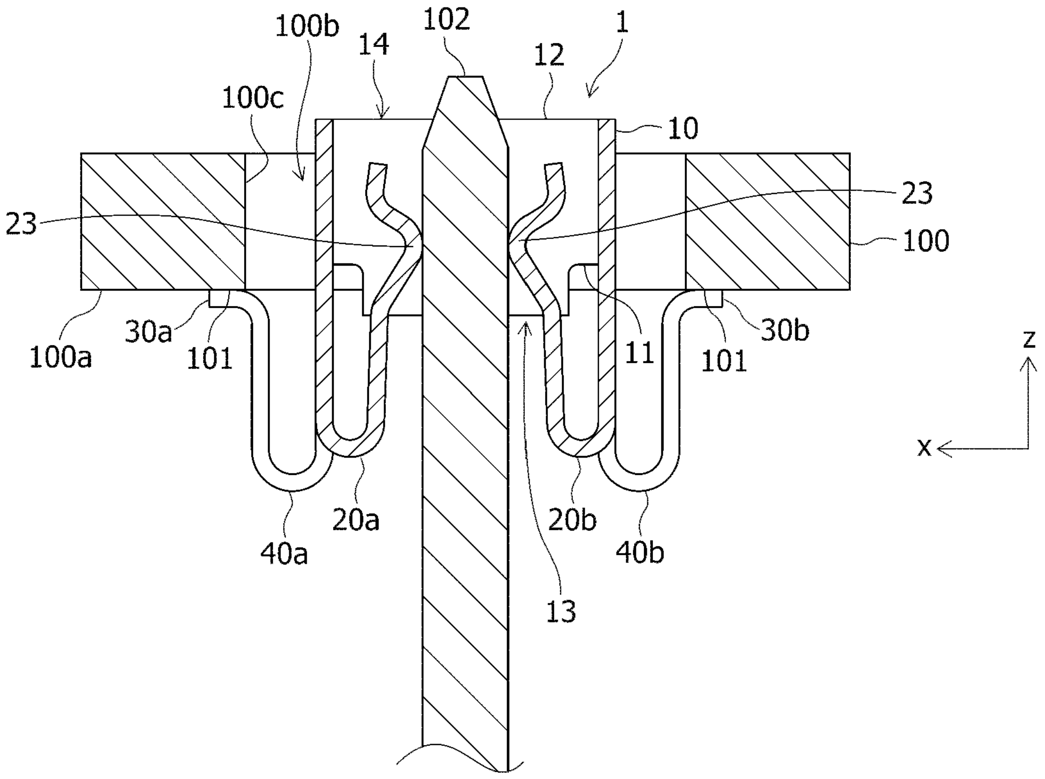
FIG. 12 is a cross-sectional view taken along line C-C in FIG. 9 in which the connector according to the first embodiment of the present invention is mounted on the circuit substrate while a mating conductor is connected at a normal position.

Hereinafter, connectors according to embodiments of the present invention will be described as appropriate in details with reference to the drawings. In the drawings, an x-axis, a y-axis, and a z-axis form a three-axis rectangular coordinate system. A description will be given assuming that a y-axis positive direction indicates a front direction, a y-axis negative direction indicates a rear direction, an x-axis positive direction indicates a left direction, an x-axis negative direction indicates a right direction, a z-axis positive direction indicates an upper direction, and a z-axis negative direction indicates a lower direction.

First Embodiment

<Configuration of Connector>

The configuration of a connector 1 according to a first embodiment of the present invention will be described in detail below with reference to FIGS. 1 to 11.

The connector 1 according to the present embodiment is formed, as a single unit, by a metal plate, and is mounted on a mounting surface **100*a* of a circuit substrate 100 so as to connect a conductive part(s) 101 of the circuit substrate 100 with a plug 102, which serves as a mating conductor. Specifically, the connector 1 includes a frame body part 10, a connection part 20, fixed parts 30, floating parts 40, and a restraining part 50**.

The frame body part 10 has a frame shape that is rectangular as viewed from above. The frame body part 10 includes a lower-end aperture edge part 11 provided around a lower aperture part 13, an upper-end aperture edge part 12 provided around an upper aperture part 14, the lower aperture part 13, the upper aperture part 14, notch parts 15 that are notched upward between the connection part 20 and each of the floating parts 40, a pair of sidewall parts 16 that are first sidewall parts facing each other, and a pair of sidewall parts 17 that are second sidewall parts facing each other and adjacent to the sidewall parts 16.

The connection part 20 is provided so as to extend from the lower-end aperture edge part 11 of the frame body part 10 toward the inside of the frame body part 10 and toward the upper-end aperture edge part 12. The connection part 20 is provided so as to extend downward from the lower-end aperture edge part 11 and is then folded upward. The connection part 20 is thus U-shaped as viewed from the front side. The connection part 20 has upper end portions 21 positioned below the upper-end aperture edge part 12 of the frame body part 10. The connection part 20 is connected to the plug 102, and when the connection part 20 is not connected to the plug 102, there is a gap between the connection part 20 and the frame body part 10.

The connection part 20 is constituted of a connection part 20*a* and a connection part 20*b* that form a pair and face each other. The connection part 20*a* and the connection part 20*b* are facing surfaces that face each other, and each include a groove part 22 provided so as to be recessed downward from a corresponding upper end portion 21 at a central part in a front-rear direction that is a plate width direction. The connection part 20*a* and the connection part 20*b* include contact parts 23 that project inward so as to approach each other and come into contact with the plug 102 within the frame body part 10. A gap between the contact part 23 of the connection part 20*a* and the contact part 23 of the connection part 20*b* is smaller than the diameter of the plug 102. Here, the facing direction of the pair of the connection part 20*a* and the connection part 20*b* is a right-left direction that is identical to the facing direction of the pair of sidewall parts 16.

The fixed parts 30 are positioned above the restraining part 50. The fixed parts 30 are fixed and connected to the conductive part 101 on the mounting surface 100*a* of the circuit substrate 100 by reflow soldering. The fixation and connection of the fixed parts 30 to the conductive part 101 are not limited to fixation and connection by reflow soldering. The fixed parts 30 may be fixed and connected to the conductive part 101 by other soldering such as flow soldering.

The fixed parts 30 are each constituted of a fixed part 30*a* and a fixed part 30*b* that form a pair. The fixed parts 30*a* are provided as a pair at the front and rear of the connection part 20*a*. The fixed parts 30*b* are provided as a pair at the front and rear of the connection part 20*b*.

The floating parts 40 connect the frame body part 10 and the fixed parts 30, and are each U-shaped when viewed from the front. The floating parts 40 elastically deform so as to support the frame body part 10 so that the frame body part 10 is freely movable along the mounting surface 100*a*. Here, "movably along the mounting surface 100*a*" means "movably in the front-back and left-right directions parallel to the mounting surface 100*a*" as well as "movably along the direction intersecting with the mounting surface 100*a*".

The floating parts 40 are each constituted of a floating part 40*a* and a floating part 40*b* that form a pair. The floating parts 40*a* are provided as a pair at the front and rear of the connection part 20*a* to connect the lower-end aperture edge part 11 of the frame body part 10 to the fixed parts 30*a*, respectively. The floating parts 40*b* are provided as a pair at the front and rear of the connection part 20*b* to connect the lower-end aperture edge part 11 of the frame body part 10 to the fixed parts 30*b*, respectively.

The restraining part 50 is provided to the frame body part 10. In the state where the connector 1 is mounted on the mounting surface 100*a* of the circuit substrate 100 without the plug 102 being connected to the connection part 20, there is a gap H1 (see FIG. 10) between the restraining part 50 and the mounting surface 100*a*. When the frame body part 10 moves upward while the connector 1 is mounted on the mounting surface 100*a* of the circuit substrate 100, the restraining part 50 comes into contact with the circuit substrate 100 and thereby restrain movement of the frame body part 10 in an upward direction that is the mounting direction, the direction in which the connector 1 is mounted on the circuit substrate 100. The restraining part 50 is provided on a pair of sidewall parts 17 of the rectangular frame body part 10. These sidewall parts 17 face each other and are also different from the pair of sidewall parts 16 that face each other and that are provided with the connection part 20 and the floating parts 40.

The restraining part 50 is constituted of a restraining part 50*a* and a restraining part 50*b* that form a pair. The restraining part 50*a* is formed by folding part of the frame body part 10 approximately 90 degrees forward from the lower-end aperture edge part 11. The restraining part 50*b* is provided as a pair over a metal plate seam 1*a* that is formed when a metal plate is folded and formed into the connector 1. The restraining part 50*b* is formed by folding part of the frame body part 10 approximately 90 degrees backward from the lower-end aperture edge part 11.

In the connector 1 with the aforementioned configuration, a length L1 between the lower-end aperture edge part 11 and the lower end portion of each of the floating parts 40 is longer than a length L2 between the lower-end aperture edge part 11 and each lower end portion of the connection part 20 (L1>L2). A length L3 of the floating parts 40 in a plate width direction is shorter than a length L4 of the connection part 20 in the plate width direction (L3<L4). The length L4 of the connection part 20 in the plate width direction is longer than a length L5 of the fixed parts 30 in the plate width direction (L4>L5). Furthermore, since the fixed parts 30 project forward from the front end or project backward from the rear end of the floating parts 40, the length L5 of the fixed parts 30 in the plate width direction is longer than the length L3 of the floating parts 40 in the plate width direction (L3<L5).

In addition, the connector 1 is formed by performing folding processing, with a jig, on the metal plate, after the plate is punched out. As a result, the seam 1*a* is produced.

<Method of Mounting Connector on Circuit Substrate>

A method of mounting the connector 1 on the circuit substrate 100 according to the first embodiment of the present invention will be described in detail below with reference to FIGS. 1 to 11.

The circuit substrate 100 includes the conductive part 101 of a circuit pattern around an insertion hole 100*b* of the mounting surface 100*a*.

First, the circuit substrate 100 is vertically inverted so that the mounting surface 100*a* is on the upper side, and the connector 1 is vertically inverted so that the upper-end aperture edge part 12 of the frame body part 10 is on the lower side.

Next, the vertically inverted connector 1 is inserted from above into the insertion hole 100*b* of the vertically inverted circuit substrate 100, and insertion of the connector 1 into the insertion hole 100*b* continues until the fixed parts 30 come into contact with the conductive part 101 of the circuit substrate 100.

Then, the fixed parts 30 are connected and fixed to the conductive part 101 of the circuit substrate 100 by reflow soldering, so that the connector 1 is mounted on the mounting surface 100*a* of the circuit substrate 100.

Then, after the connector 1 is mounted on the mounting surface 100*a* of the circuit substrate 100, the connector 1 and the circuit substrate 100 are vertically inverted into their original state. In this state, the floating parts 40 and a region of the connection part 20 below each of the contact parts 23 are positioned blow the mounting surface 100*a*. Moreover, since the frame body part 10 is positioned within the insertion hole 100*b*, and there is also a gap between the frame body part 10 and front, rear, left, and right inner walls 100*c* that form the insertion hole 100*b* of the circuit substrate 100, the frame body part 10 can move in the front, rear, left, and right directions within the insertion hole 100*b*.

Since the connector 1 is mounted on the mounting surface 100*a* while being inserted into the insertion hole 100*b*, the entire height of the connector 1 and the circuit substrate 100 can be lowered.

In addition, since the fixed parts 30 are provided above the restraining part 50, the fixed parts 30 are positioned more on a distal-end side (an upper side) than the restraining part 50 in the upward direction that is the mounting direction in the case where the vertical inversion is not performed. Accordingly, when the connector 1 is mounted on the mounting surface 100*a*, there is a gap between the restraining part 50 and the mounting surface 100*a*. This gap makes it possible to prevent the restraining part 50 from coming into contact with the mounting surface 100*a* before the fixed parts 30 come into contact with the conductive part 101. As a result, connection of the fixed parts 30 to the conductive part 101 can be ensured.

Note that the number of the connectors 1 mounted on the circuit substrate 100 is not limited to one, and may be two or more as necessary. In this case, when two or more plugs 102 are collectively connected to two or more connectors 1, the displacement of the respective plugs 102 with respect to the respective connectors 1 may increase. As a solution, providing the configuration of the present embodiment can stabilize the connection between the respective connection parts 20 and the respective plugs 102.

<Operation of Connector>

The operation of the connector 1 according to the first embodiment of the present invention will be described in detail below with reference to FIGS. 1 to 13.

The plug 102 is inserted into and removed from the connector 1 mounted on the mounting surface 100*a* of the circuit substrate 100. First, in the case of inserting the plug 102 into the connector 1 to achieve connection therebetween, the plug 102 is inserted to the lower aperture part 13 of the frame body part 10 of the connector 1, which is mounted on the mounting surface 100*a* of the circuit substrate 100, from below.

Then, the contact parts 23 of the connection part 20 come into contact with the plug 102 that is inserted to the lower aperture part 13 from below, and thereby elastically deform outward in the right-left directions.

At that time, when the connection part 20 is pulled upward by the plug 102 and the frame body part 10 consequently moves upward following the connection part 20, the restraining part 50 comes into contact with the mounting surface 100*a* of the circuit substrate 100 to restrain the upward movement of the connector 1. This restraint makes it possible to prevent buckling and plastic deformation of the floating parts 40.

Moreover, the restraining part 50 is provided on the sidewall parts 17 of the rectangular frame body part 10, which are different from the sidewall parts 16 where the connection part 20 and the floating parts 40 are provided. This arrangement makes it possible to increase the width of the restraining part 50 in the right-left direction and to increase the area of contact with the mounting surface 100*a*, so that the movement of the connector 1 and the frame body part 10 can reliably be restrained.

Next, the connection part 20 pinches the plug 102 from the left and right sides by its own elastic recovery force and connects to the plug 102.

In this case, when the plug 102 is in a displaced state, the connection part 20 elastically deforms, and the frame body part 10 elastically deforms with the elastic deformation of the connection part 20. As a result, the connection part 20 further presses the sidewall parts 16 from the inside, and the frame body part 10 elastically deforms, so that a load is applied to the floating parts 40 via the connection part 20 and the frame body part 10. With the application of the load, the floating parts 40 elastically deform and move the frame body part 10 in a load application direction. When the frame body part 10 moves in the load application direction, the connection part 20 can maintain the connection state to the plug 102 provided in the case where the plug 102 is not displaced with respect to the connector 1. As a result, a stable connection to the plug 102 is achieved.

Here, the state where the plug 102 is displaced includes: the states where the plug 102 is displaced, from the position where the plug 102 stably connects to the connection part 20, in the directions parallel to the front, rear, left, and right directions; the state where the plug is inclined in the up-down direction; and combined states of these. The position where the plug 102 stably connects to the connection part 20 is the position where the plug 102 connects to the connection part 20*a* and the connection part 20*b* at a contact pressure of a prescribed value or more and the plug 102 connects to the connection part 20*a* and the connection part 20*b* at substantially the same contact pressure.

Figure 13:
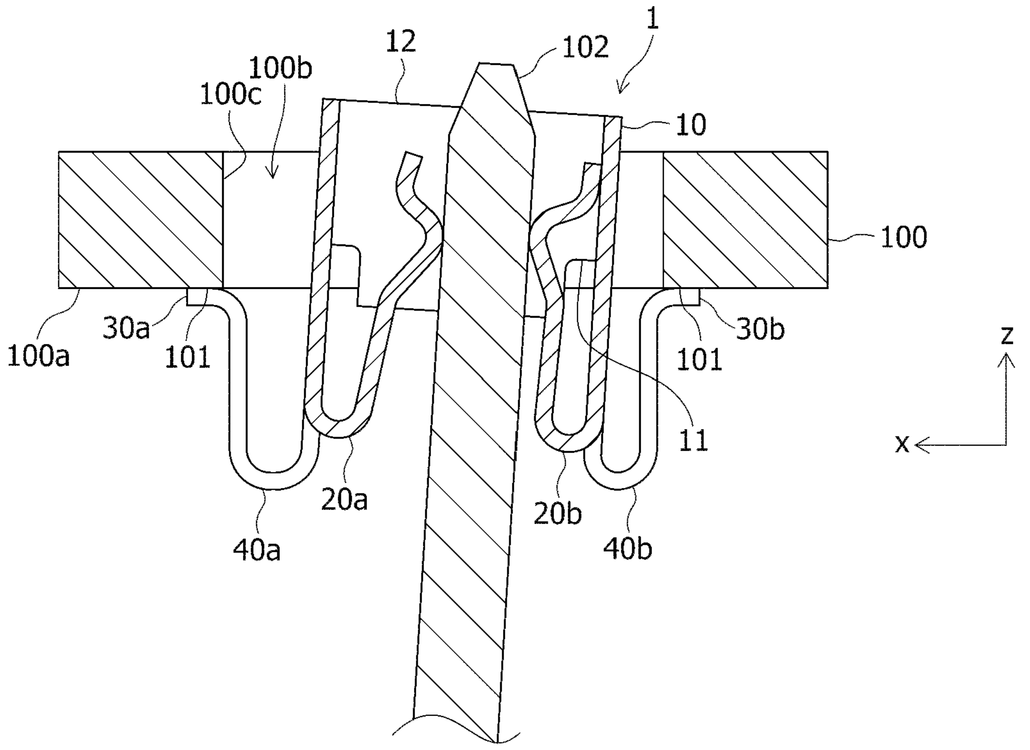
FIG. 13 is a cross-sectional view taken along line C-C in FIG. 9 in which the connector according to the first embodiment of the present invention is mounted on the circuit substrate while a mating conductor is connected at a displaced position.
Figure 14:
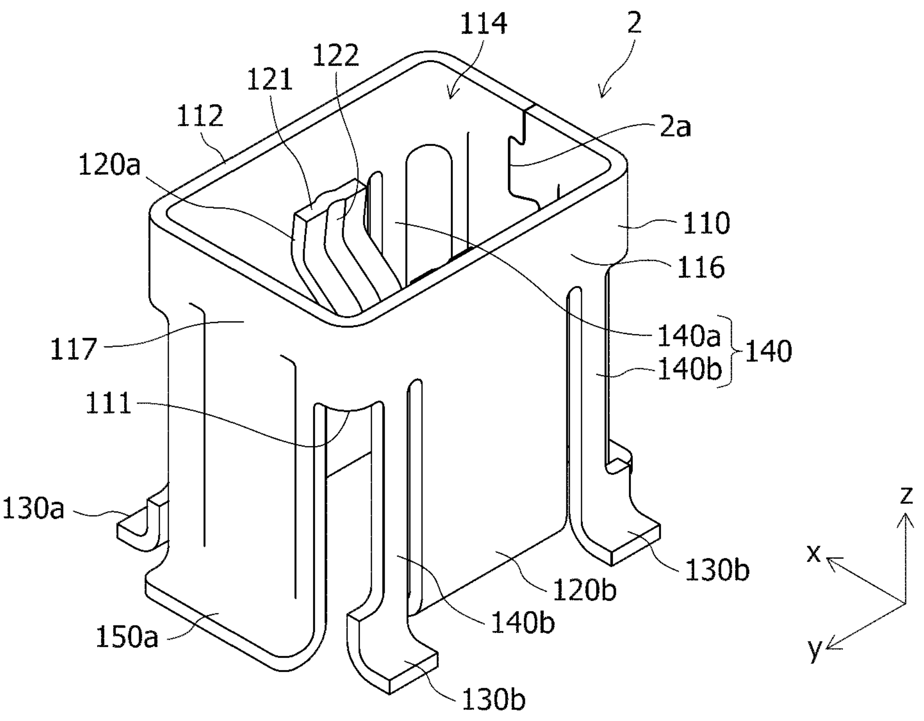
FIG. 14 is a perspective view of a connector according to a second embodiment of the present invention, when viewed from above.
Figure 15:
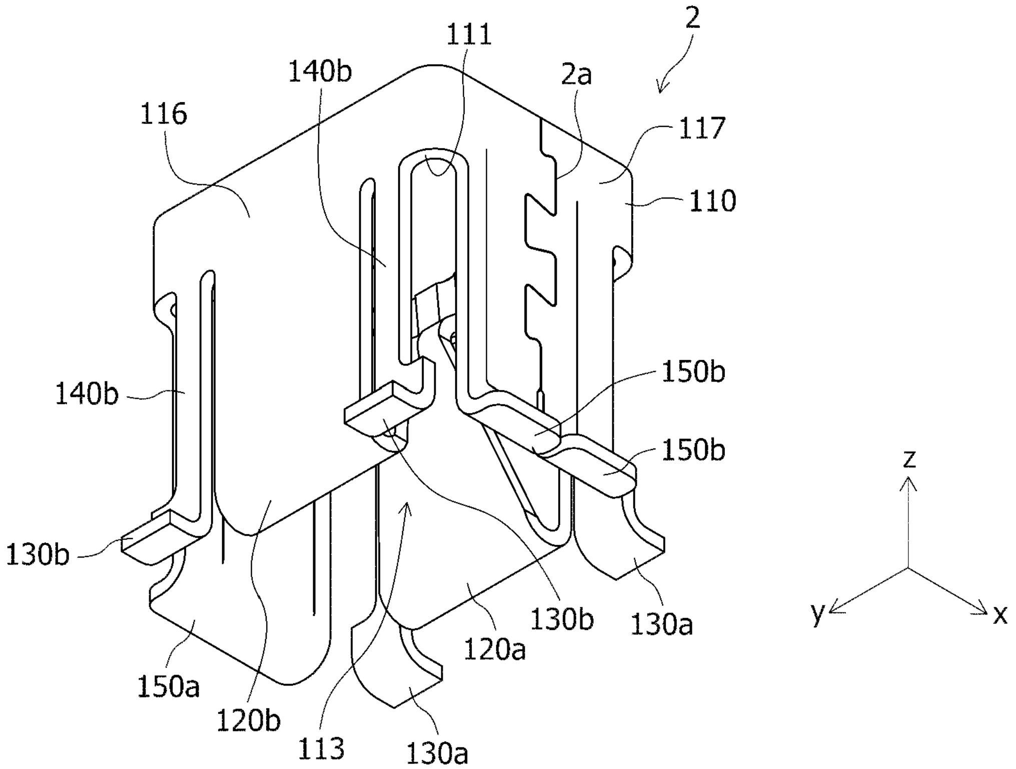
FIG. 15 is a perspective view of the connector according to the second embodiment of the present invention, when viewed from below.
Figure 16:
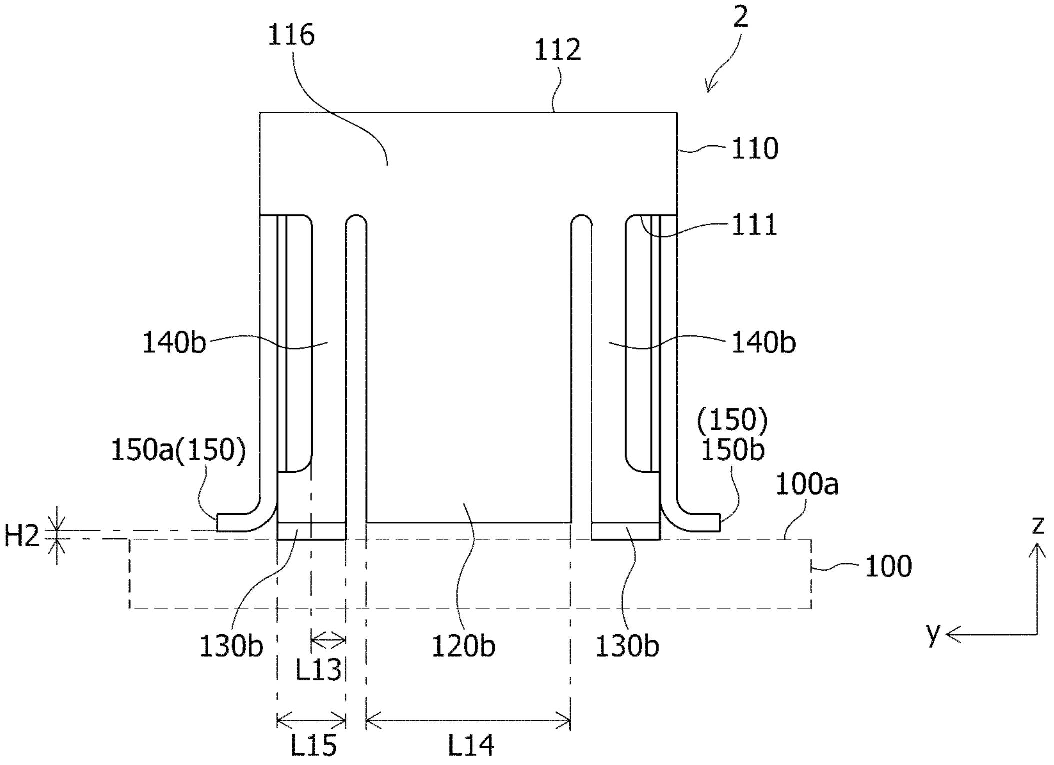
FIG. 16 is a side view of the connector according to the second embodiment of the present invention.
Figure 17:
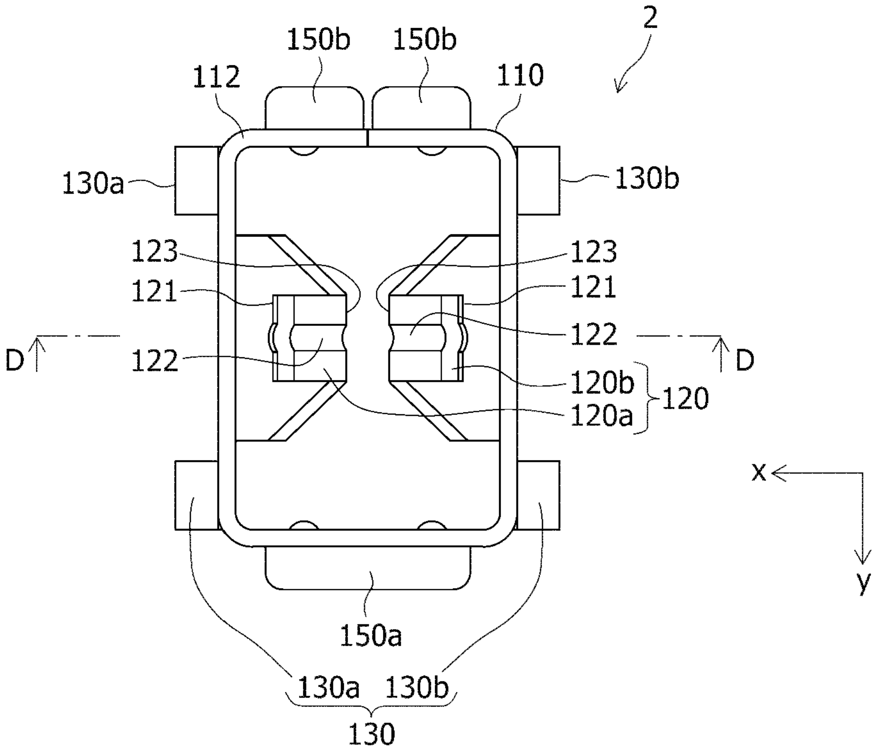
FIG. 17 is a plan view of the connector according to the second embodiment of the present invention.
Figure 18:
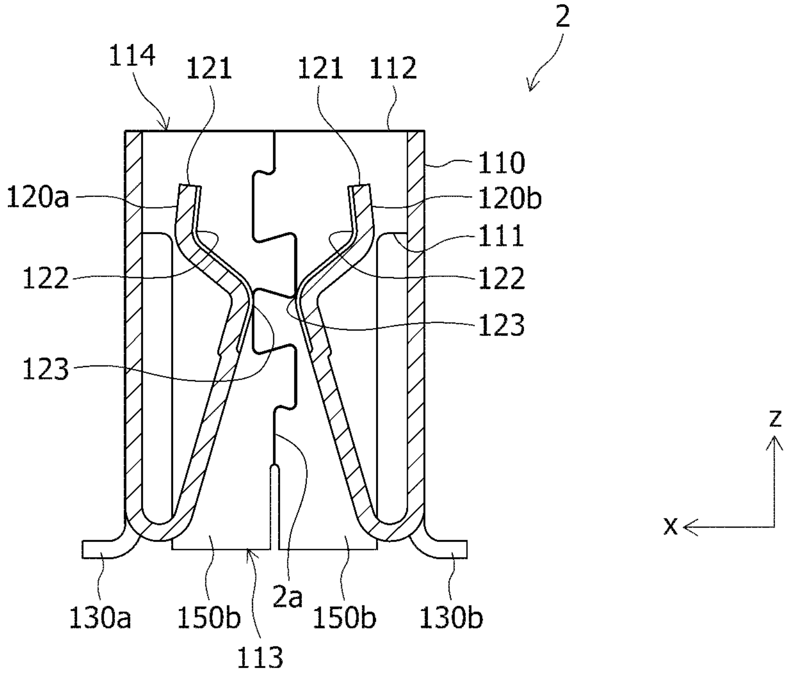
FIG. 18 is a cross-sectional view of the connector taken along line D-D in FIG. 17.
Figure 19:
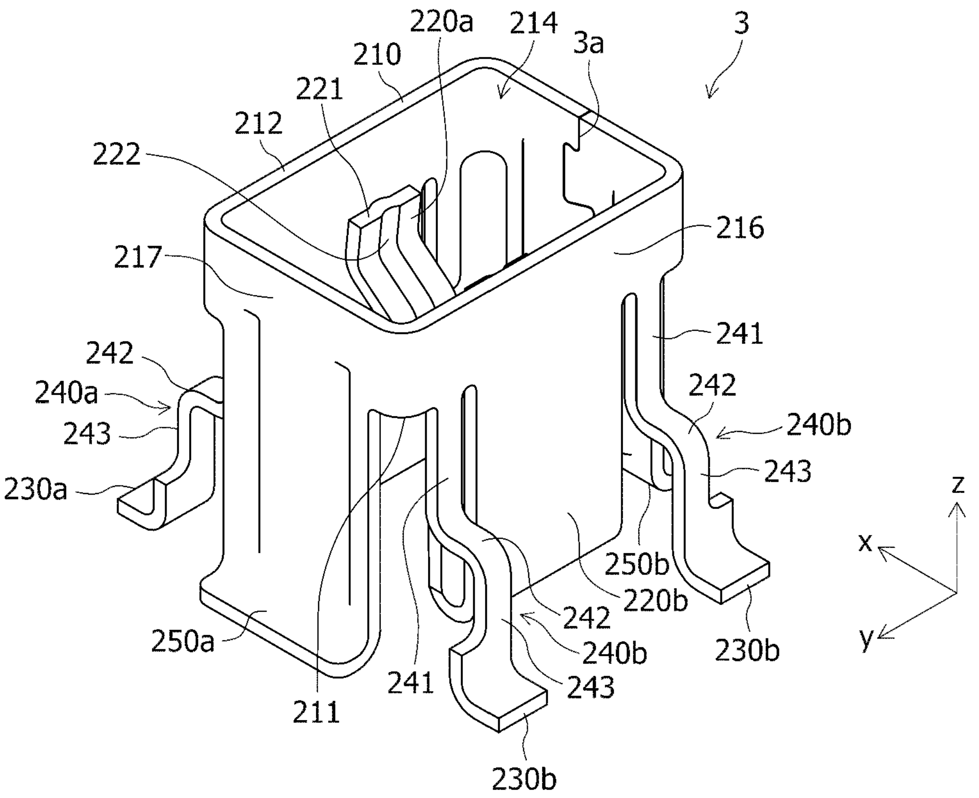
FIG. 19 is a perspective view of a connector according to a third embodiment of the present invention, when viewed from above.
Figure 20:
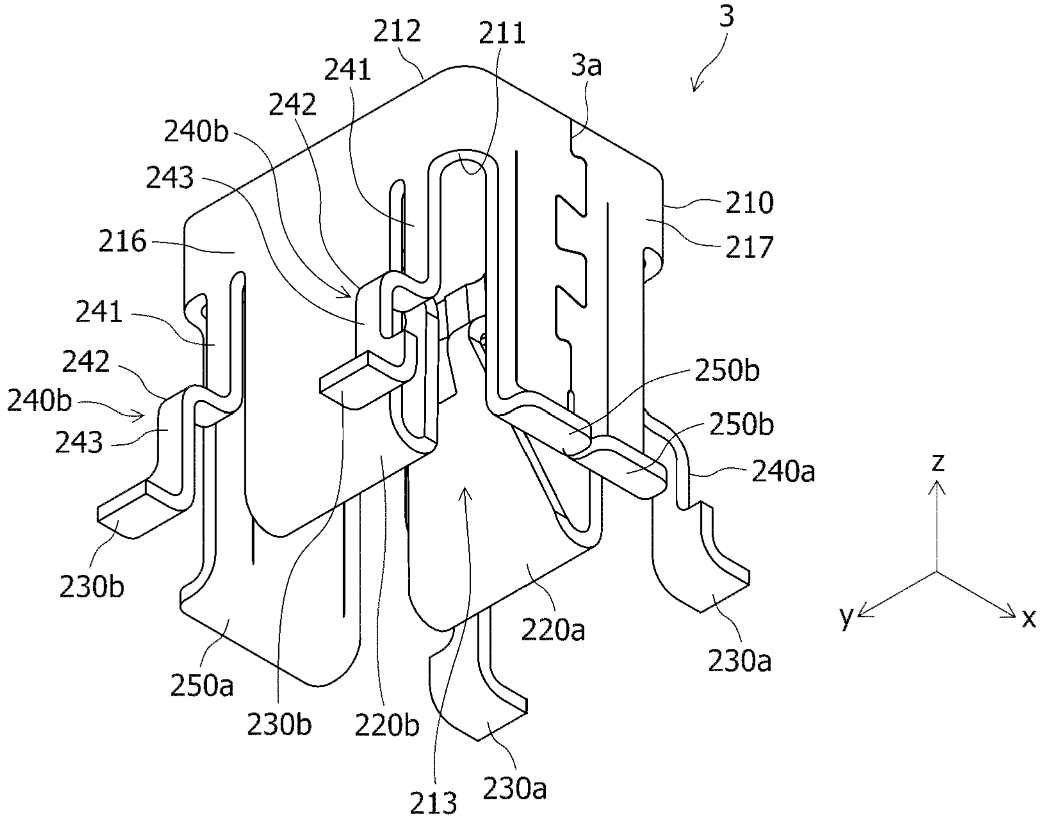
FIG. 20 is a perspective view of the connector according to the third embodiment of the present invention, when viewed from below.
Figure 21:
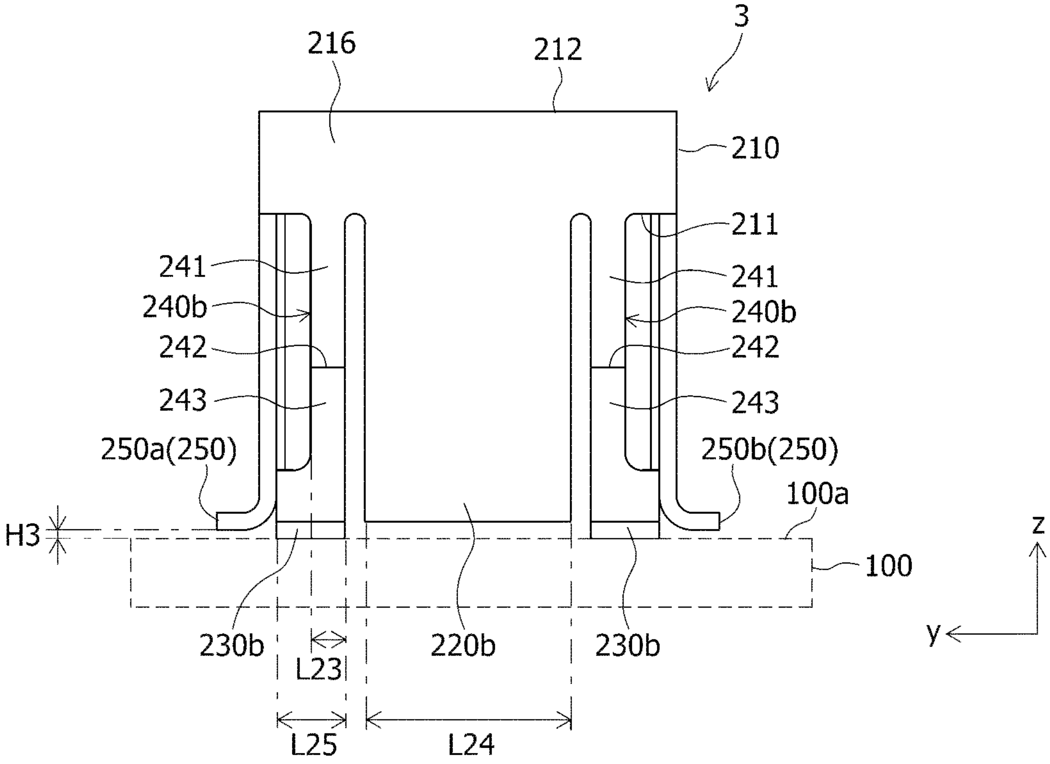
FIG. 21 is an elevation view of the connector according to the third embodiment of the present invention.
Figure 22:
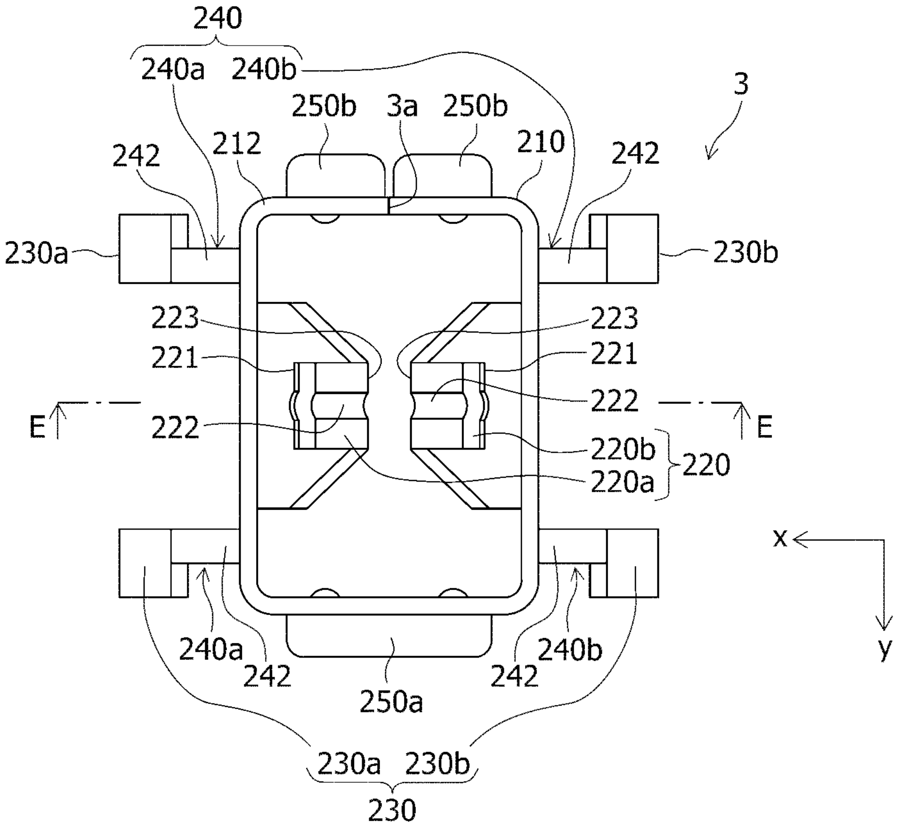
FIG. 22 is a plan view of the connector according to the third embodiment of the present invention.
Figure 23:
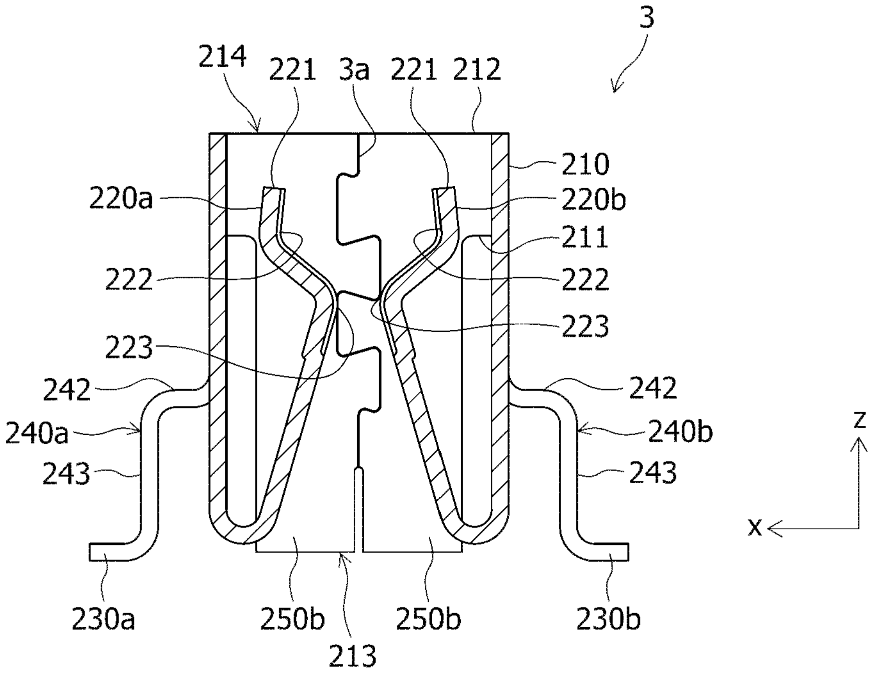
FIG. 23 is a cross-sectional view of the connector taken along line E-E in FIG. 22.
Figure 24:
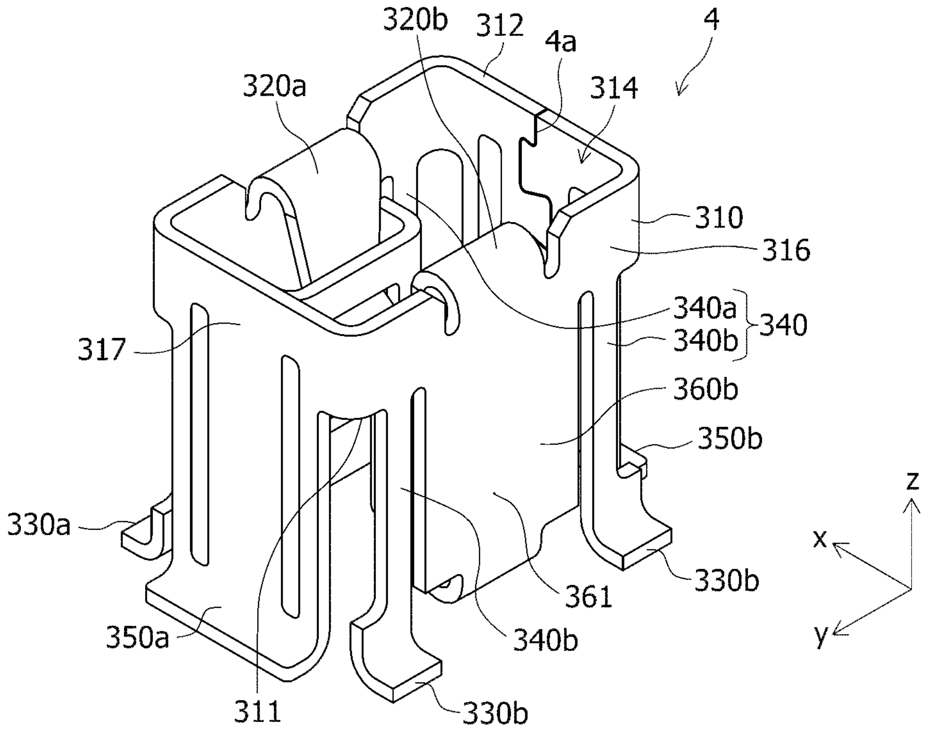
FIG. 24 is a perspective view of a connector according to a fourth embodiment of the present invention, when viewed from above.
Figure 25:
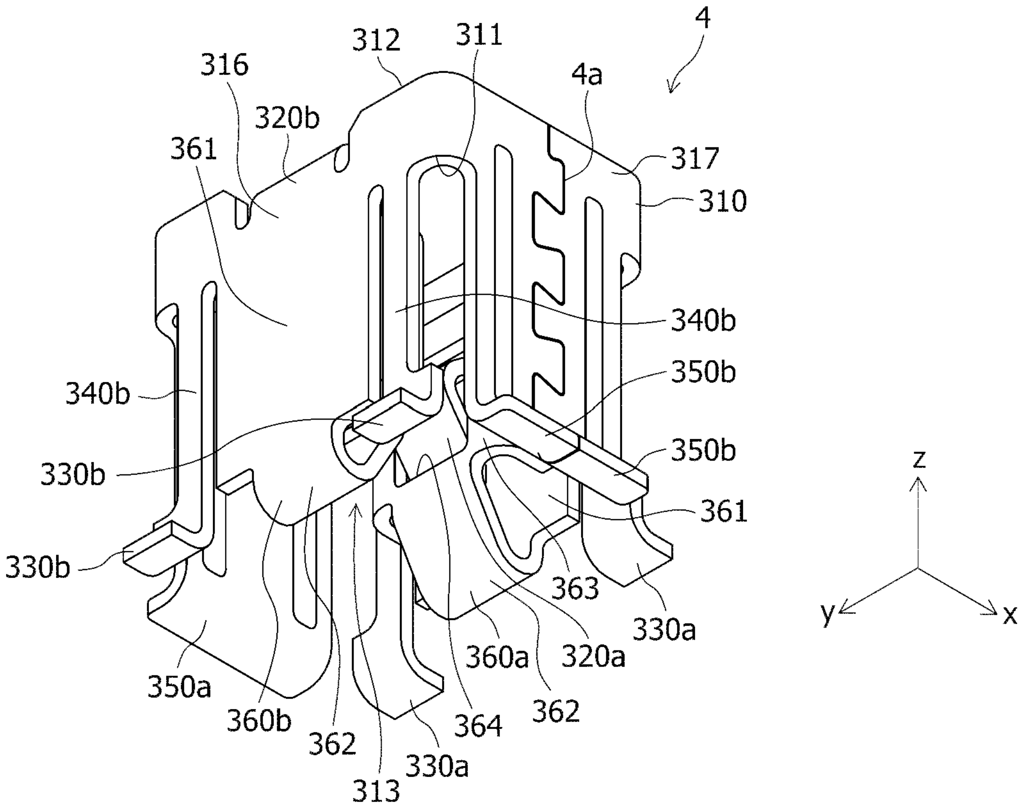
FIG. 25 is a perspective view of the connector according to the fourth embodiment of the present invention, when viewed from below.
Figure 26:
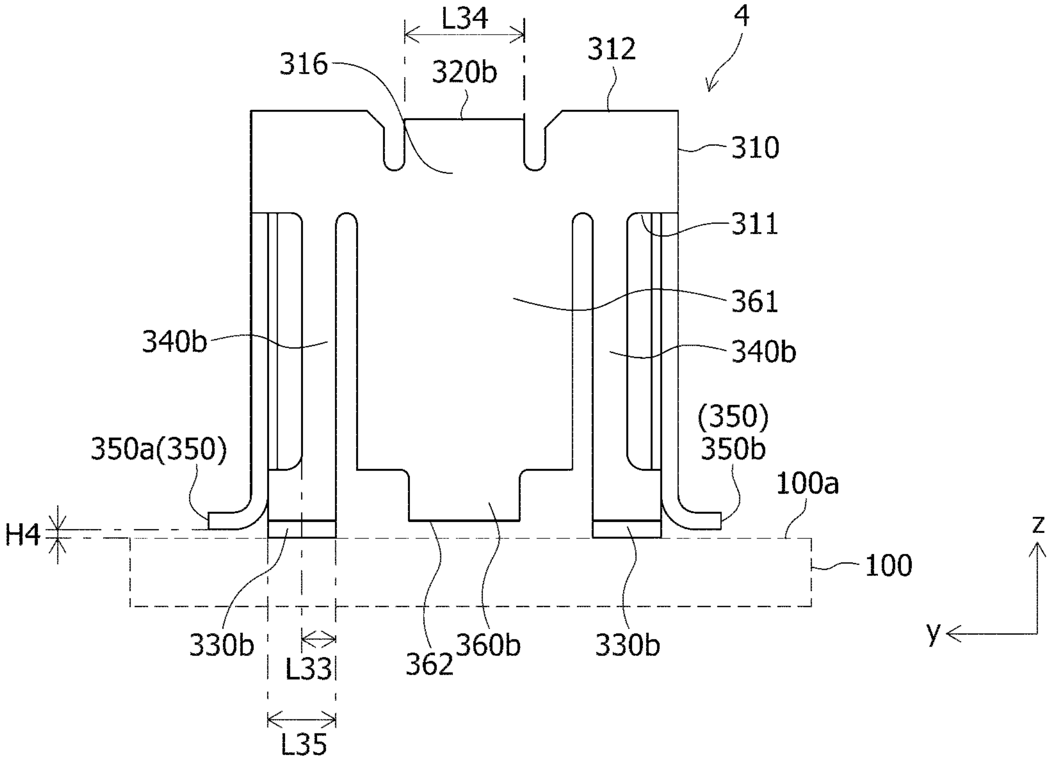
FIG. 26 is an elevation view of the connector according to the fourth embodiment of the present invention.
Figure 27:
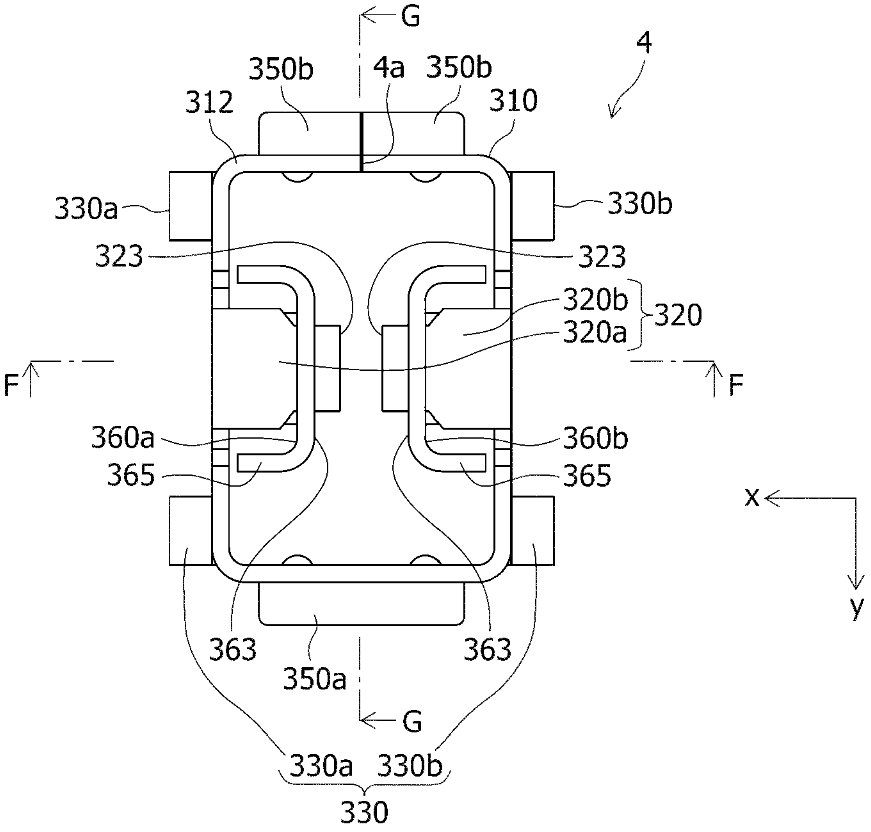
FIG. 27 is a plan view of the connector according to the fourth embodiment of the present invention.
Figure 28:
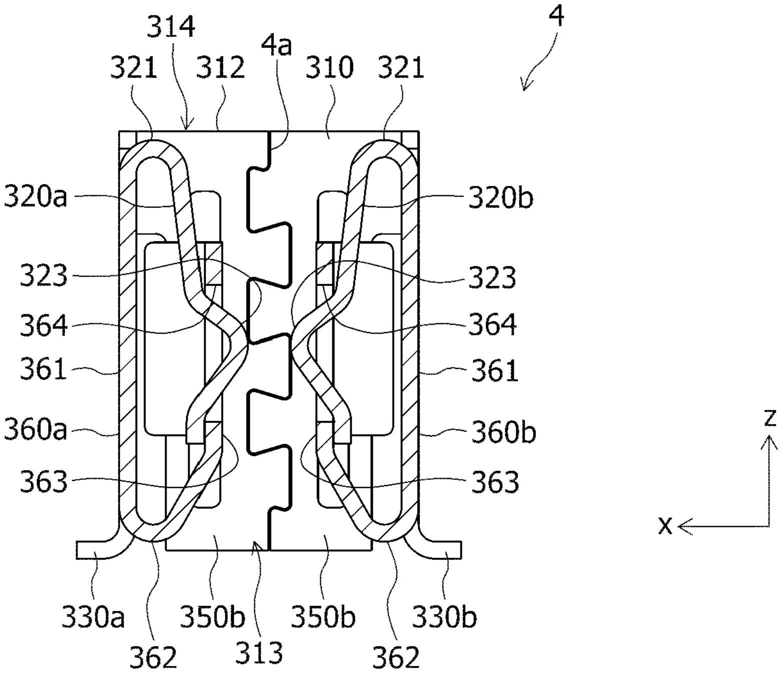
FIG. 28 is a cross-sectional view of the connector taken along line F-F in FIG. 27.
Figure 29:
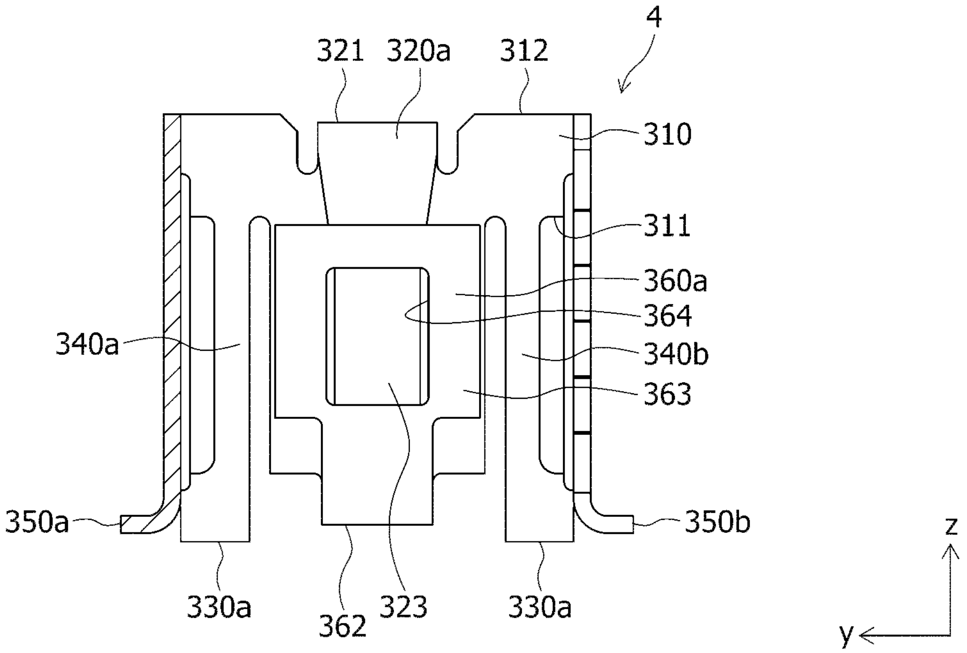
FIG. 29 is a cross-sectional view of the connector taken along line G-G in FIG. 27.
Figure 30:
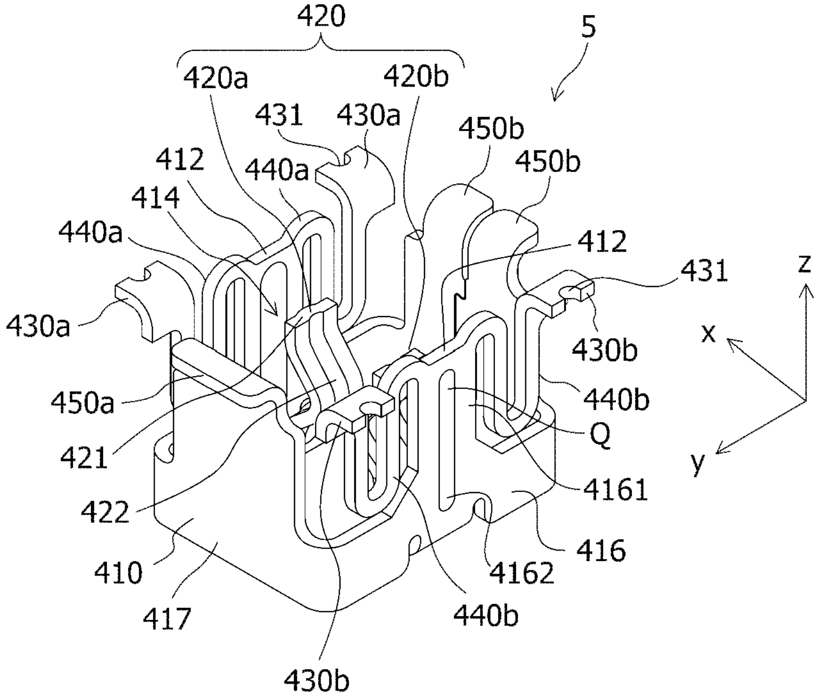
FIG. 30 is a perspective view of a connector according to a fifth embodiment of the present invention, when viewed from above.
Figure 31:
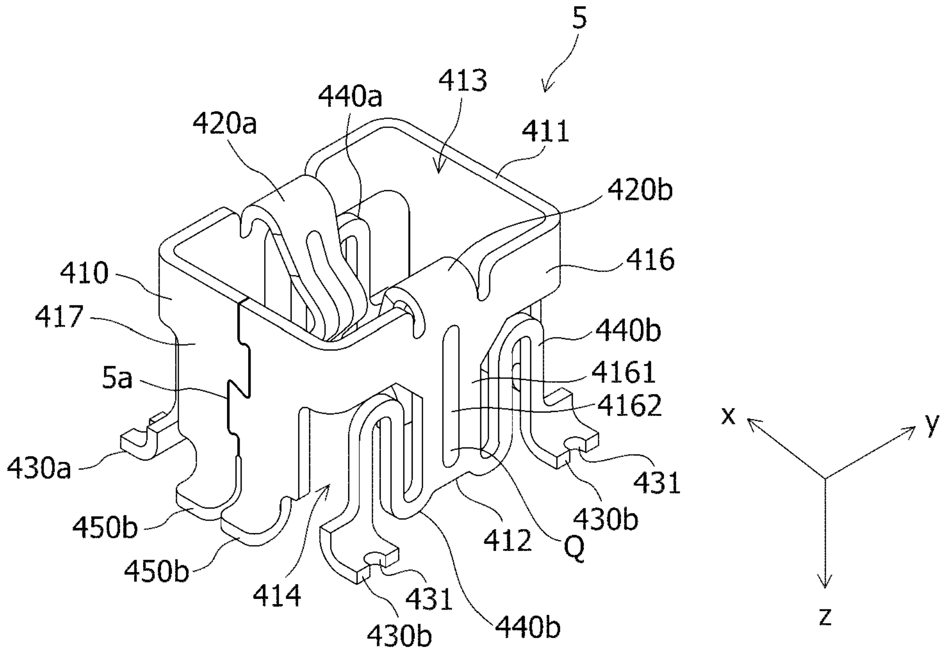
FIG. 31 is a perspective view of the connector according to the fifth embodiment of the present invention, when viewed from below.
Figure 32:
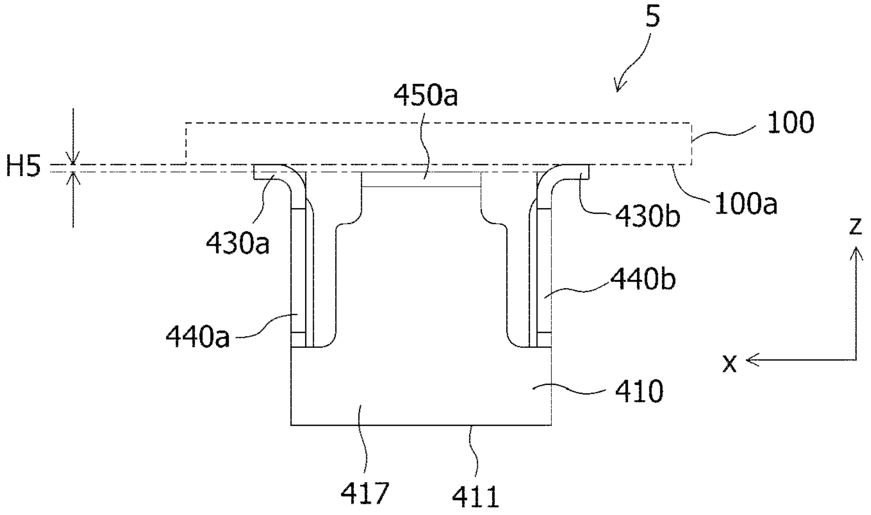
FIG. 32 is an elevation view of the connector according to the fifth embodiment of the present invention.
Figure 33:
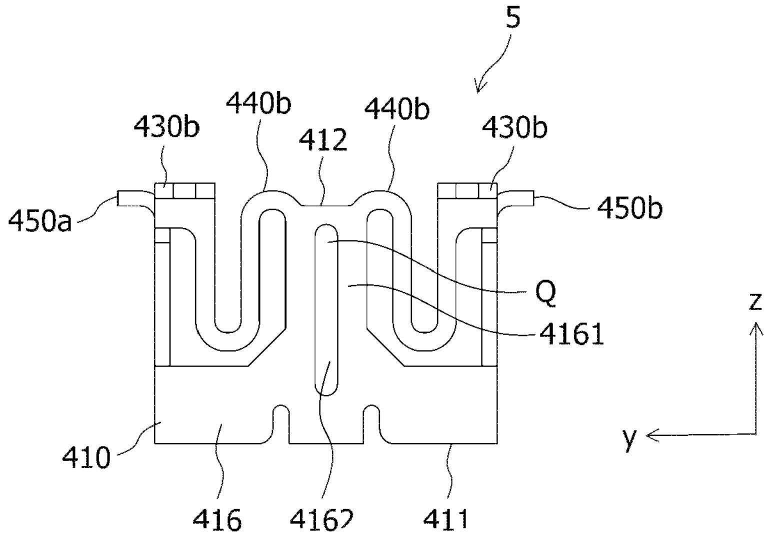
FIG. 33 is a side view of the connector according to the fifth embodiment of the present invention.
Figure 34:
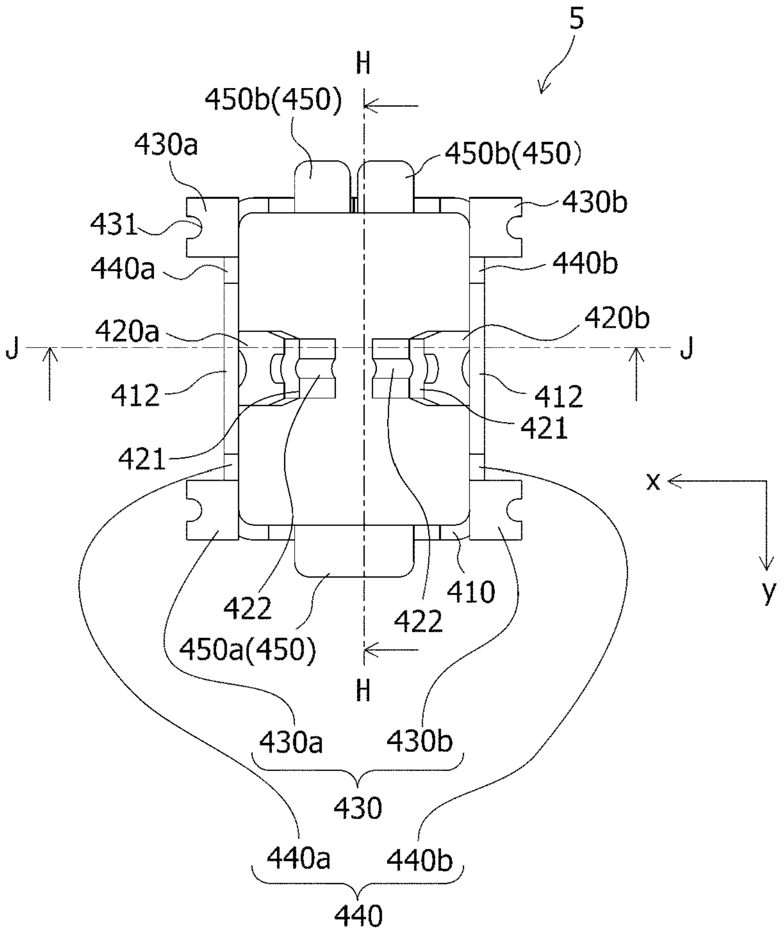
FIG. 34 is a plan view of the connector according to the fifth embodiment of the present invention.
Figure 35:
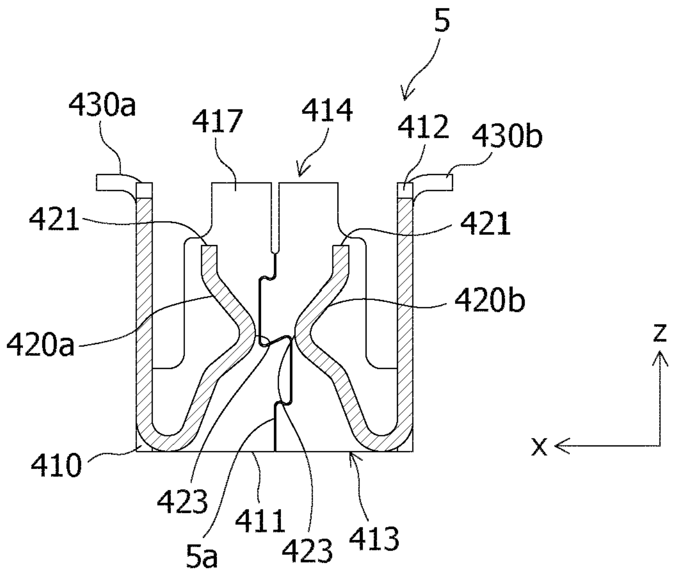
FIG. 35 is a cross-sectional view of the connector taken along line H-H in FIG. 34.
Figure 36:
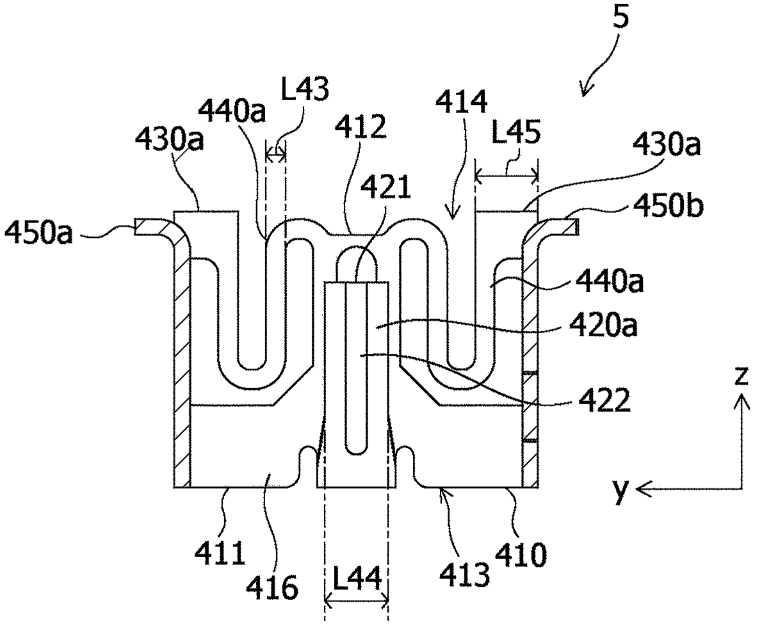
FIG. 36 is a cross-sectional view of the connector taken along line J-J in FIG. 34.

For example, as shown in FIG. 13, when the plug 102 is connected to the connection part 20 in the state of being inclined to the right with respect to the up-down direction, the plug 102 presses the connection part 20*b* in an obliquely lower right direction, so that the connection part 20*b* elastically deforms and presses the frame body part 10 in the obliquely lower right direction from the inside. The floating parts 40 elastically deform by receiving the load applied when the frame body part 10 is pressed in the obliquely lower right direction, and move the frame body part 10 in the obliquely lower right direction that is the pressing direction of the connection part 20*b*. When the frame body part 10 moves in the load application direction, the connection part 20 can suppress application of an excessive load to the connection part 20*b* and also suppress reduction of the contact pressure between the plug 102 and the connection part 20*a*. The connection part 20 can also maintain the connection state to the plug 102 provided in the case where the plug 102 is not displaced with respect to the connector 1, so that the connector 1 can stably connect to the plug 102.

Since the floating parts 40 are provided so as to extend from the sidewall parts 16 that face each other in the facing direction in which the connection part 20*a* and the connection part 20*b* face each other, it is possible to improve the followability of the elastic deformation of the floating parts 40 with respect to the elastic deformation of the connection part 20 caused by the displacement of the plug 102. Since the floating parts 40 are provided so as to extend from the sidewall parts 16 that are pressed by the connection part 20, it is possible to improve the followability of the elastic deformation of the floating parts 40 with respect to the pressing force applied from the connection part 20 to the sidewall parts 16 due to the displacement of the plug 102.

In the above-described operation, the length L1 between the lower-end aperture edge part 11 and the lower end portion of each of the floating parts 40 is set longer than the length L2 between the lower-end aperture edge part 11 and each lower end portion of the connection part 20, so that the floating parts 40 can be made to deform more easily than the connection part 20. In addition, providing the notch parts 15 between the connection part 20 and the floating parts 40 can also facilitate elastic deformation of the floating parts 40.

Moreover, the length L2 between the lower-end aperture edge part 11 and each lower end portion of the connection part 20 is set shorter than the length L1 between the lower-end aperture edge part 11 and the lower end portion of each of the floating parts 40, so that connection stability of the connection part 20 can be improved. The length L3 of the floating parts 40 in the plate width direction is set shorter than the length L4 of the connection part 20 in the plate width direction, so that the floating parts 40 can be made to deform more easily than the connection part 20. In addition, when the length L4 of the connection part 20 in the plate width direction is set longer than the length L3 of the floating parts 40 in the plate width direction, the connection stability of the connection part 20 can be improved.

Moreover, since the floating parts 40 and a region of the connection part 20 below each of the contact parts 23 are positioned below the mounting surface 100*a* of the circuit substrate 100, the connection part 20 and the floating parts 40 can elastically deform without interfering with the circuit substrate 100.

Since the upper end portions 21 of the connection part 20 are positioned below the upper-end aperture edge part 12, the connection part 20 can be protected by the frame body 10, so that deformation of the connection part 20 can be prevented.

In the case where the connection part 20 presses the frame body part 10 as shown in FIG. 13 as well as in the case where the connection part 20 does not press the frame body part 10, the floating parts 40 elastically deform in accordance with the pressing force that the connection part 20 receives from the plug 102. Therefore, the frame body part 10 can behave in a similar manner as described above, so that the connection part 20 can stably connect to the plug 102.

Even in the case where a load, due to some external force, is applied after the connection part 20 and the plug 102 are connected to each other, the connector 1 can still perform the same operation that is performed when a load is applied at the time when the connection part 20 and the plug 102 are connected to each other.

To cancel the connection between the connector 1 and the plug 102, the plug 102 is pulled downward. As a result, the floating parts 40 return to the state before connection to the plug 102 by their own elastic recovery force, and the frame body part 10 accordingly returns to the state before connection to the plug 102.

Thus, according to the present embodiment, the connector 1 mounted on the circuit substrate 100 and formed, as a single unit, by a metal plate that connects the conductive part 101 of the circuit substrate 100 to the plug 102 includes: the pair of connection parts 20*a* and 20*b* that are provided so as to extend from the lower-end aperture edge part 11 of the frame body part 10 toward the inside of the frame body part 10 and toward the upper-end aperture edge part 12 and to be connected to the plug 102; the pair of fixed parts 30*a* and 30*b* that are fixed and connected to the conductive part 101; and the pair of floating parts 40*a* and 40*b* that connect the lower-end aperture edge part 11 with the pair of fixed parts 30*a* and 30*b*, respectively, and support the frame body part 10 so that the frame body part 10 is freely movable. Accordingly, even when displacement of the plug 102 occurs when the connection is being established or after the establishment of a connection to the plug 102, it is possible to maintain an electrically stable connection.

In the present embodiment, the connection part 20 and the floating parts 40 are provided on the same sides of the rectangular frame body part 10, and the restraining part 50 is provided on the different sides. However, without being limited thereto, the floating parts 40 and the restraining part 50 may be provided on the same sides of the frame body part 10, and the connection part 20 may be provided on the different sides, or the connection part 20 and the restraining part 50 may be provided on the same sides of the frame body part 10, and the floating parts 40 may be provided on the different sides.

In the present embodiment, the restraining part 50 is provided at the lower-end aperture edge part 11. However, without being limited thereto, the restraining part 50 may be provided at other than the lower-end aperture edge part 11 by a method such as cutting and folding some part of the frame body part 10.

In the present embodiment, the length between the lower-end aperture edge part 11 and the lower end portion of each of the floating parts 40 is set longer than the length between the lower-end aperture edge part 11 and each lower end portion of the connection part 20. However, without being limited thereto, the length between the lower-end aperture edge part 11 and the lower end portion of each of the floating parts 40 may be identical to the length between the lower-end aperture edge part 11 and each lower end portion of the connection part 20, or the length between the lower-end aperture edge part 11 and the lower end portion of each of the floating parts 40 may be shorter than the length between the lower-end aperture edge part 11 and each lower end portion of the connection part 20.

In the present embodiment, the connector 1 is connected to the plug 102. However, without being limited thereto, the connector 1 may be connected to a mating conductor other than the plug 102.

Second Embodiment

<Configuration of Connector>

The configuration of a connector 2 according to a second embodiment of the present invention will be described in detail below with reference to FIGS. 14 to 18.

The connector 2 according to the present embodiment is formed, as a single unit, by a metal plate, and is mounted on the mounting surface 100*a* of the circuit substrate 100 so as to connect the conductive part 101 of the circuit substrate 100 to the plug 102. Specifically, the connector 2 includes a frame body part 110, a connection part 120, fixed parts 130, floating parts 140, and a restraining part 150.

The frame body part 110 has a frame shape that is rectangular as viewed from above. The frame body part 110 includes a lower-end aperture edge part 111 provided around a lower aperture part 113, an upper-end aperture edge part 112 provided around an upper aperture part 114, the lower aperture part 113, the upper aperture part 114, a pair of sidewall parts 116 that are first sidewall parts facing each other, and a pair of sidewall parts 117 that are second sidewall parts facing each other and adjacent to the sidewall parts 116.

The connection part 120 is provided so as to extend from the lower-end aperture edge part 111 of the frame body part 110 toward the inside of the frame body part 110 and toward the upper-end aperture edge part 112. The connection part 120 is provided so as to extend downward from the lower-end aperture edge part 111 and is then folded upward. The connection part 120 is U-shaped as viewed from the front side. The connection part 120 has upper end portions 121 positioned below the upper-end aperture edge part 112 of the frame body part 110. The connection part 120 is connected to the plug 102, and when the connection part 120 is not connected to the plug 102, there is a gap between the connection part 120 and the frame body part 110.

The connection part 120 is constituted of a connection part 120*a* and a connection part 120*b* that form a pair and face each other. The connection part 120*a* and the connection part 120*b* are facing surfaces that face each other and each include a groove part 122 provided so as to be recessed downward from the upper end portion 121 at a central part in a front-rear direction that is a plate width direction. The connection part 120*a* and the connection part 120*b* include contact parts 123 that project inward so as to approach each other and come into contact with the plug 102 within the frame body part 110. A gap between the contact part 123 of the connection part 120*a* and the contact part 123 of the connection part 120*b* is smaller than the diameter of the plug 102. Here, the facing direction of the pair of the connection part 120*a* and the connection part 120*b* is a right-left direction that is identical to the facing direction of the pair of sidewall parts 116.

The fixed parts 130 are positioned below the restraining part 150. The fixed parts 130 are fixed and connected to the conductive part 101 on the mounting surface 100*a* of the circuit substrate 100 by reflow soldering. The fixation and connection of the fixed parts 130 to the conductive part 101 are not limited to the fixation and connection by reflow soldering. The fixed parts 30 may be fixed and connected to the conductive part 101 by other soldering such as flow soldering.

The fixed parts 130 are each constituted of a fixed part 130*a* and a fixed part 130*b* that form a pair. The fixed parts 130*a* are provided as a pair at the front and rear of the connection part 120*a*. The fixed parts 130*b* are provided as a pair at the front and rear of the connection part 120*b*.

The floating parts 140, which connect the frame body part 110 and the fixed part 130, are provided so as to extend downward from the lower-end aperture edge part 111. The floating parts 140 elastically deform so as to support the frame body part 110 so that the frame body part 110 is freely movable along the mounting surface 100*a*.

The floating parts 140 are each constituted of a floating part 140*a* and a floating part 140*b* that form a pair. The floating parts 140*a* are provided as a pair at the front and rear of the connection part 120*a* to connect the lower-end aperture edge part 111 of the frame body part 110 to the fixed parts 130*a*, respectively. The floating parts 140*b* are provided as a pair at the front and rear of the connection part 120*b* to connect the lower-end aperture edge part 111 of the frame body part 110 to the fixed parts 130*b*, respectively.

The restraining part 150 is provided to the frame body part 110. In the state where the connector 2 is mounted on the mounting surface 100*a* of the circuit substrate 100 without the plug 102 being connected to the connection part 120, there is a gap H2 (see FIG. 16) between the restraining part 150 and the mounting surface 100*a*. When the frame body part 110 moves downward, the restraining part 150 comes into contact with the circuit substrate 100 and thereby restrain movement of the frame body part 110 in a downward direction that is the mounting direction, the direction in which the connector 2 is mounted on the circuit substrate 100. The restraining part 150 is provided on the pair of sidewall parts 117 of the rectangular frame body part 110. These sidewall parts 117 face each other and are also different from the pair of sidewall parts 116 that face each other and that are provided with the connection part 120 and the floating parts 140.

The restraining part 150 is constituted of a restraining part 150*a* and a restraining part 150*b* that form a pair. The restraining part 150*a* is formed by making part of the frame body part 110 extend downward from the lower-end aperture edge part 111 and folding, approximately 90 degrees forward, distal end portions in the extending direction. The restraining part 150*b* is provided as a pair across a metal plate seam 2*a* formed when a metal plate is folded and formed into the connector 2. The restraining part 150*b* is formed by making part of the frame body part 110 extend downward from the lower-end aperture edge part 111 and folding, approximately 90 degrees backward, distal end portions in the extending direction.

In the connector 2 with the aforementioned configuration, a length L13 of the floating parts 140 in the plate width direction is shorter than a length L14 of the connection part 120 in the plate width direction (L13<L14). The length L14 of the connection part 120 in the plate width direction is longer than a length L15 of the fixed parts 130 in the plate width direction (L14>L15). Furthermore, since the fixed parts 130 project forward from the front end or project backward from the rear end of the floating parts 140, the length L15 of the fixed parts 130 in the plate width direction is longer than the length L13 of the floating parts 140 in the plate width direction (L13<L15).

In addition, the connector 2 is formed by performing folding processing, with a jig, on the metal plate, after the plate is punched out. As a result, the seam 2*a* is produced.

<Method of Mounting Connector on Circuit Substrate>

A method of mounting the connector 2 on the circuit substrate 100 according to the second embodiment of the present invention will be described in detail below with reference to FIGS. 14 to 18.

First, the connector 2 is mounted on the mounting surface 100*a* of the circuit substrate 100 from above so that the fixed parts 130 come into contact with the conductive part 101 of the circuit substrate 100.

Then, the fixed parts 130 are connected and fixed to the conductive part 101 of the circuit substrate 100 by reflow soldering, so that the connector 2 is mounted on the mounting surface 100*a* of the circuit substrate 100. Note that the circuit substrate 100 has an unillustrated insertion hole 100*b* formed below the connection part 120.

Since the fixed parts 130 are provided below the restraining part 150, the fixed parts 130 are positioned more on the distal-end side (the lower side) than the restraining part 150 in the downward direction that is the mounting direction. Accordingly, when the connector 2 is mounted on the mounting surface 100*a*, there is a gap between the restraining part 150 and the mounting surface 100*a*. This gap makes it possible to prevent the restraining part 150 from coming into contact with the mounting surface 100*a* before the fixed parts 130 come into contact with the conductive part 101. As a result, connection of the fixed parts 130 to the conductive part 101 can be ensured.

Note that the number of the connectors 2 mounted on the circuit substrate 100 is not limited to one, and may be two or more as necessary. In this case, when two or more plugs 102 are collectively connected to two or more connectors 2, the displacement of the respective plugs 102 with respect to the respective connectors 2 may increase. As a solution, providing the configuration of the present embodiment can stabilize the connection between the respective connection parts 120 and the respective plugs 102.

<Operation of Connector>

The operation of the connector 2 according to the second embodiment of the present invention will be described in detail below with reference to FIGS. 14 to 18.

The plug 102 is inserted into and removed from the connector 2 mounted on the mounting surface 100*a* of the circuit substrate 100. First, in the case of inserting the plug 102 into the connector 2 to achieve connection therebetween, the plug 102 is inserted, through the insertion hole 100*b*, to the lower aperture part 113 of the frame body part 110 of the connector 2, which is mounted on the circuit substrate 100, from below.

Then, the contact parts 123 of the connection part 120 come into contact with the plug 102 that is inserted to the lower aperture part 113 of the frame body part 110 from below, and thereby elastically deform outward in the right-left direction.

Next, the connection part 120 pinches the plug 102 from the left and right sides by its own elastic recovery force and connects to the plug 102.

In this case, when the plug 102 is in a displaced state, the connection part 120 elastically deforms, and the frame body part 110 elastically deforms with the elastic deformation of the connection part 120. As a result, the connection part 120 further presses the sidewall parts 116 from the inside, and the frame body part 110 elastically deforms, so that a load is applied to the floating parts 140 via the connection part 120 and the frame body part 110. With the application of the load, the floating parts 140 elastically deform and move the frame body part 110 in a load application direction. When the frame body part 110 moves in the load application direction, the connection part 120 can maintain the connection state to the plug 102 provided in the case where the plug 102 is not displaced with respect to the connector 2. As a result, a stable connection to the plug 102 is achieved.

For example, when the plug 102 is connected to the connection part 120 in the state of being inclined to the right with respect to the up-down direction, the plug 102 presses the connection part 120*b* in an obliquely lower right direction, so that the connection part 120*b* elastically deforms and presses the frame body part 110 in the obliquely lower right direction from the inside. The floating parts 140 elastically deform by receiving the load applied when the frame body part 110 is pressed in the obliquely lower right direction, and move the frame body part 110 in the obliquely lower right direction that is the pressing direction of the connection part 120*b*. When the frame body part 110 moves in the load application direction, the connection part 120 can suppress application of an excessive load to the connection part 120*b* and also suppress reduction of the contact pressure between the plug 102 and the connection part 120*a*. The connection part 20 can also maintain the connection state to the plug 102 provided in the case where the plug 102 is not displaced with respect to the connector 2, so that the connector 2 can stably connect to the plug 102.

Since the floating parts 140 are provided so as to extend from the sidewall parts 116 that face each other in the facing direction in which the connection part 120*a* and the connection part 120*b* face each other, it is possible to improve the followability of the elastic deformation of the floating parts 140 with respect to the elastic deformation of the connection part 120 caused by the displacement of the plug 102. Since the floating parts 140 are provided so as to extend from the sidewall parts 116 that are pressed by the connection part 120, it is possible to improve the followability of the elastic deformation of the floating parts 140 with respect to the pressing force applied from the connection part 120 to the sidewall parts 116 due to the displacement of the plug 102.

In the above-described operation, the length L13 of the floating parts 140 in the plate width direction is set shorter than the length L14 of the connection part 120 in the plate width direction, so that the floating parts 140 can be made to deform more easily than the connection part 120. In addition, the length L14 of the connection part 120 in the plate width direction is set longer than the length L13 of the floating parts 140 in the plate width direction, so that the connection stability of the connection part 120 can be improved.

Since the upper end portions 121 of the connection part 120 are positioned below the upper-end aperture edge part 112, the connection part 120 can be protected by the frame body part 110, so that deformation of the connection part 120 can be prevented.

In the case where the connection part 120 presses the frame body part 110 as well as in the case where the connection part 120 does not press the frame body part 110, the floating parts 140 elastically deform in accordance with the pressing force that the connection part 120 receives from the plug 102. Therefore, the frame body part 110 can behave in a similar manner as described above, so that the connection part 120 can stably connect to the plug 102.

Even in the case where a load, due to some external force, is applied after the connection part 120 and the plug 102 are connected to each other, the connector 2 can still perform the same operation that is performed when a load is applied at the time when the connection part 120 and the plug 102 are connected to each other.

To cancel the connection between the connector 2 and the plug 102, the plug 102 is pulled downward. As a result, the floating parts 140 return to the state before connection to the plug 102 by their own elastic recovery force, and the frame body part 110 accordingly returns to the state before connection to the plug 102.

At that time, when the connection part 120 is pulled downward by the plug 102 and the frame body part 110 consequently moves downward following the connection part 120, the restraining part 150 comes into contact with the mounting surface 100*a* of the circuit substrate 100 to restrain the downward movement of the connector 2. This restraint makes it possible to prevent buckling and plastic deformation of the floating parts 140.

Moreover, the restraining part 150 is provided on the sidewall parts 117 of the rectangular frame body part 110, which are different from the sidewall parts 116 where the connection part 120 and the floating parts 140 are provided. This arrangement makes it possible to increase the width of the restraining part 150 in the right-left direction and to increase the area of contact with the mounting surface 100*a*, so that the movement of the connector 2 and the frame body part 110 can reliably be restrained.

Thus, according to the present embodiment, the connector 2 includes: the pair of connection parts 120*a* and 120*b* that are provided so as to extend from the lower-end aperture edge part 111 of the frame body part 110 toward the inside of the frame body part 110 and toward the upper-end aperture edge part 112 and to be connected to the plug 102; the pair of fixed parts 130*a* and 130*b* that are fixed and connected to the conductive part 101; and the pair of floating parts 140*a* and 140*b* that connect the lower-end aperture edge part 111 with the pair of fixed parts 130*a* and 130*b*, respectively, and support the frame body part 110 so that the frame body part 110 is freely movable. Accordingly, even when displacement of the plug 102 occurs when the connection is being established or after the establishment of a connection to the plug 102, it is possible to maintain an electrically stable connection.

In the present embodiment, the connection part 120 and the floating parts 140 are provided on the same sides of the rectangular frame body part 110, and the restraining part 150 is provided on the different sides. However, without being limited thereto, the floating parts 140 and the restraining part 150 may be provided on the same sides of the frame body part 110, and the connection part 120 may be provided on the different sides, or the connection part 120 and the restraining part 150 may be provided on the same sides of the frame body part 110, and the floating parts 140 may be provided on the different sides.

In the present embodiment, the connector 2 is connected to the plug 102. However, without being limited thereto, the connector 2 may be connected to a mating conductor other than the plug 102.

Third Embodiment

<Configuration of Connector>

The configuration of a connector 3 according to a third embodiment of the present invention will be described in detail below with reference to FIGS. 19 to 23.

The connector 3 according to the present embodiment is formed, as a single unit, by a metal plate, and is mounted on the mounting surface 100*a* of the circuit substrate 100 so as to connect the conductive part 101 of the circuit substrate 100 to the plug 102. Specifically, the connector 3 includes a frame body part 210, a connection part 220, fixed parts 230, floating parts 240, and a restraining part 250.

The frame body part 210 has a frame shape that is rectangular as viewed from above. The frame body part 210 includes a lower-end aperture edge part 211 provided around a lower aperture part 213, an upper-end aperture edge part 212 provided around an upper aperture part 214, the lower aperture part 213, the upper aperture part 214, a pair of sidewall parts 216 that are first sidewall parts facing each other, and a pair of sidewall parts 217 that are second sidewall parts facing each other and adjacent to the sidewall parts 216.

The connection part 220 is provided so as to extend from the lower-end aperture edge part 211 of the frame body part 210 toward the inside of the frame body part 210 and toward the upper-end aperture edge part 212. The connection part 220 is provided so as to extend downward from the lower-end aperture edge part 211 and is then folded upward. The connection part 220 is U-shaped as viewed from the front side. The connection part 220 has upper end portions 221 positioned below the upper-end aperture edge part 212 of the frame body part 210. The connection part 220 is connected to the plug 102, and when the connection part 220 is not connected to the plug 102, there is a gap between the connection part 220 and the frame body part 210.

The connection part 220 is constituted of a connection part 120*a* and a connection part 220*b* that form a pair and face each other. The connection part 220*a* and the connection part 220*b* are facing surfaces that face each other and each include a groove part 222 provided so as to be recessed downward from the upper end portion 221 at a central part in a front-rear direction that is a plate width direction. The connection part 220*a* and the connection part 220*b* include contact parts 223 that project inward so as to approach each other and come into contact with the plug 102 within the frame body part 210. A gap between the contact part 223 of the connection part 220*a* and the contact part 223 of the connection part 220*b* is smaller than the diameter of the plug 102. Here, the facing direction of the pair of the connection part 220*a* and the connection part 220*b* is a right-left direction that is identical to the facing direction of the pair of sidewall parts 216.

The fixed parts 230 are positioned below the restraining part 250. The fixed parts 230 are fixed and connected to the conductive part 101 on the mounting surface 100*a* of the circuit substrate 100 by reflow soldering. The fixation and connection of the fixed parts 230 to the conductive part 101 are not limited to the fixation and connection by reflow soldering. The fixed parts 30 may be fixed and connected to the conductive part 101 by other soldering such as flow soldering.

The fixed parts 230 are each constituted of a fixed part 230*a* and a fixed part 230*b* that form a pair. The fixed parts 230*a* are provided as a pair at the front and rear of the connection part 220*a*. The fixed parts 230*b* are provided as a pair at the front and rear of the connection part 220*b*.

The floating parts 240 connect the frame body part 210 and the fixed parts 230. The floating parts 240 are each constituted of an inwardly suspended part 241 provided so as to extend downward from the lower-end aperture edge part 211, a folded part 242 folded outward from a lower end portion of the inwardly suspended part 241, and an outwardly suspended part 243 provided so as to extend downward from an outer end portion of the folded part 242 and to be connected to the fixed parts 230. The floating parts 240 each have a crank shape. The floating parts 240 elastically deform so as to support the frame body part 210 so that the frame body part 210 is freely movable along the mounting surface 100*a*.

The floating parts 240 are each constituted of a floating part 240*a* and a floating part 240*b* that form a pair. The floating parts 240*a* are provided as a pair at the front and rear of the connection part 220*a* to connect the lower-end aperture edge part 211 of the frame body part 210 to the fixed parts 230*a*, respectively. The floating parts 240*b* are provided as a pair at the front and rear of the connection part 220*b* to connect the lower-end aperture edge part 211 of the frame body part 210 to the fixed parts 230*b*, respectively.

The restraining part 250 is provided to the frame body part 210. In the state where the connector 3 is mounted on the mounting surface 100*a* of the circuit substrate 100 without the plug 102 being connected to the connection part 220, there is a gap H3 (see FIG. 21) between the restraining part 250 and the mounting surface 100*a*. When the frame body part 210 moves downward, the restraining part 250 comes into contact with the circuit substrate 100 and thereby restrain movement of the frame body part 210 in the downward direction that is the mounting direction, the direction in which the connector 3 is mounted on the circuit substrate 100. The restraining part 250 is provided on the pair of sidewall parts 217 of the rectangular frame body part 210. The sidewall parts 217 face each other and are also different from the pair of sidewall parts 216 that face each other and that are provided with the connection part 220 and the floating parts 240.

The restraining part 250 is constituted of a restraining part 250*a* and a restraining part 250*b* that form a pair. The restraining part 250*a* is formed by making part of the frame body part 210 extend downward from the lower-end aperture edge part 211 and folding, approximately 90 degrees forward, distal end portions in the extending direction. The restraining part 250*b* is provided as a pair across a metal plate seam 3*a* formed when a metal plate is folded and formed into the connector 3. The restraining part 250*b* is formed by making part of the frame body part 210 extend downward from the lower-end aperture edge part 211 and folding, approximately 90 degrees backward, distal end portions in the extending direction.

In the connector 3 with the aforementioned configuration, a length L23 of the floating parts 240 in the plate width direction is shorter than a length L24 of the connection part 220 in the plate width direction (L23<L24). The length L24 of the connection part 220 in the plate width direction is longer than a length L25 of the fixed parts 230 in the plate width direction (L24>L25). Furthermore, since the fixed parts 230 project forward from the front end or project backward from the rear end of the floating parts 240, the length L25 of the fixed parts 230 in the plate width direction is longer than the length L23 of the floating parts 240 in the plate width direction (L23<L25).

In addition, the connector 3 is formed by performing folding processing, with a jig, on the metal plate, after the plate is punched out. As a result, the seam 3*a* is produced.

<Method of Mounting Connector on Circuit Substrate>

A method of mounting the connector 3 on the circuit substrate 100 according to the third embodiment of the present invention will be described in detail below with reference to FIGS. 19 to 23.

First, the connector 3 is mounted on the mounting surface 100*a* of the circuit substrate 100 from above so that the fixed parts 230 come into contact with the conductive part 101 of the circuit substrate 100.

Then, the fixed parts 230 are connected and fixed to the conductive part 101 of the circuit substrate 100 by reflow soldering, so that the connector 3 is mounted on the mounting surface 100*a* of the circuit substrate 100. Note that the circuit substrate 100 has an unillustrated insertion hole 100*b* formed below the connection part 220.

Since the fixed parts 230 are provided below the restraining part 250, the fixed parts 230 are positioned more on the distal-end side (the lower side) than the restraining part 250 in the upward direction that is the mounting direction. Accordingly, when the connector 3 is mounted on the mounting surface 100*a*, there is a gap between the restraining part 250 and the mounting surface 100*a*. This gap makes it possible to prevent the restraining part 250 from coming into contact with the mounting surface 100*a* before the fixed parts 230 come into contact with the conductive part 101. As a result, connection of the fixed parts 230 to the conductive part 101 can be ensured.

Note that the number of the connectors 3 mounted on the circuit substrate 100 is not limited to one, and may be two or more as necessary. In this case, when two or more plugs 102 are collectively connected to two or more connectors 3, the displacement of the respective plugs 102 with respect to the respective connectors 3 may increase. As a solution, providing the configuration of the present embodiment can stabilize the connection between the respective connection parts 220 and the respective plugs 102.

<Operation of Connector>

The operation of the connector 3 according to the third embodiment of the present invention will be described in detail below with reference to FIGS. 19 to 23.

The plug 102 is inserted into and removed from the connector 3 mounted on the mounting surface 100*a* of the circuit substrate 100. First, in the case of inserting the plug 102 into the connector 3 to achieve connection therebetween, the plug 102 is inserted to the lower aperture part 213 of the frame body part 210 of the connector 3, which is mounted on the circuit substrate 100, from below.

Then, the contact parts 223 of the connection part 220 come into contact with the plug 102 that is inserted to the lower aperture part 213 of the frame body part 210 from below, and thereby elastically deform outward in the right-left direction.

Next, the connection part 220 pinches the plug 102 from the left and right sides by its own elastic recovery force and connects to the plug 102.

In this case, when the plug 102 is in a displaced state, the connection part 220 elastically deforms, and the frame body part 210 elastically deforms with the elastic deformation of the connection part 220. As a result, the connection part 220 further presses the sidewall parts 216 from the inside, and the frame body part 210 elastically deforms, so that a load is applied to the floating parts 240 via the connection part 220 and the frame body part 210. With the application of the load, the floating parts 240 elastically deform and move the frame body part 210 in a load application direction. When the frame body part 210 moves in the load application direction, the connection part 220 can maintain the connection state to the plug 102 provided in the case where the plug 102 is not displaced with respect to the connector 3. As a result, a stable connection to the plug 102 is achieved.

For example, when the plug 102 is connected to the connection part 220 in the state of being inclined to the right with respect to the up-down direction, the plug 102 presses the connection part 220*b* in an obliquely lower right direction, so that the connection part 220*b* elastically deforms and presses the frame body part 210 in the obliquely lower right direction from the inside. The floating parts 240 elastically deform by receiving the load applied when the frame body part 210 is pressed in the obliquely lower right direction, and moves the frame body part 210 in the obliquely lower right direction that is the pressing direction of the connection part 220*b*. When the frame body part 210 moves in the load application direction, the connection part 220 can suppress application of an excessive load to the connection part 220*b* and also suppress reduction of the contact pressure between the plug 102 and the connection part 220*a*. The connection part 220 can also maintain the connection state to the plug 102 provided in the case where the plug 102 is not displaced with respect to the connector 3, so that the connector 3 can stably connect to the plug 102.

Since the floating parts 240 are provided so as to extend from the sidewall parts 216 that face each other in the facing direction in which the connection part 220*a* and the connection part 220*b* face each other, it is possible to improve the followability of the elastic deformation of the floating parts 240 with respect to the elastic deformation of the connection part 220 caused by the displacement of the plug 102. Since the floating parts 240 are provided so as to extend from the sidewall parts 216 that are pressed by the connection part 220, it is possible to improve the followability of the elastic deformation of the floating parts 240 with respect to the pressing force applied from the connection part 220 to the sidewall parts 216 due to the displacement of the plug 102.

In the above-described operation, the length L23 of the floating parts 240 in the plate width direction is set shorter than the length L24 of the connection part 220 in the plate width direction, so that the floating parts 240 can be made to deform more easily than the connection part 220. In addition, the length L24 of the connection part 220 in the plate width direction is set longer than the length L23 of the floating parts 240 in the plate width direction, so that the connection stability of the connection part 220 can be improved.

In addition, forming the floating parts 240 into a crank shape can also facilitate elastic deformation of the floating parts 240.

Since the upper end portions 221 of the connection part 220 are positioned below the upper-end aperture edge part 212, the connection part 220 can be protected by the frame body part 210, so that deformation of the connection part 220 can be prevented.

In the case where the connection part 220 presses the frame body part 210 as well as in the case where the connection part 220 does not press the frame body part 210, the floating parts 240 elastically deform in accordance with the pressing force that the connection part 220 receives from the plug 102. Therefore, the frame body part 210 can behave in a similar manner as described above, so that the connection part 220 can stably connect to the plug 102.

Even in the case where a load, due to some external force, is applied after the connection part 220 and the plug 102 are connected to each other, the connector 3 can still perform the same operation that is performed when a load is applied at the time when the connection part 220 and the plug 102 are connected to each other.

To cancel the connection between the connector 3 and the plug 102, the plug 102 is pulled downward. As a result, the floating parts 240 return to the state before connection to the plug 102 by their own elastic recovery force, and the frame body part 210 accordingly returns to the state before connection to the plug 102.

At that time, when the connection part 220 is pulled downward by the plug 102 and the frame body part 210 consequently moves downward following the connection part 220, the restraining part 250 comes into contact with the mounting surface 100*a* of the circuit substrate 100 to restrain the downward movement of the connector 3. This restraint makes it possible to prevent buckling and plastic deformation of the floating parts 240.

Moreover, the restraining part 250 is provided on the sidewall parts 217 of the rectangular frame body part 210, which are different from the sidewall parts 216 where the connection part 220 and the floating parts 240 are provided. This arrangement makes it possible to increase the width of the restraining part 250 in the right-left direction and to increase the area of contact with the mounting surface 100*a*, so that the movement of the connector 3 and the frame body part 210 can reliably be restrained.

Thus, according to the present embodiment, the connector 3 includes: the pair of connection parts 220*a* and 220*b* that are provided so as to extend from the lower-end aperture edge part 211 of the frame body part 210 toward the inside of the frame body part 210 and toward the upper-end aperture edge part 212 and to be connected to the plug 102; the pair of fixed parts 230*a* and 230*b* that are fixed and connected to the conductive part 101; and the pair of floating parts 240*a* and 240*b* that connect the lower-end aperture edge part 211 with the pair of fixed parts 230*a* and 230*b*, respectively, and support the frame body part 210 and the connection part 220 so that they are freely movable. Accordingly, even when displacement of the plug 102 occurs when the connection is being established or after the establishment of a connection to the plug 102, it is possible to maintain an electrically stable connection.

In the present embodiment, the connection part 220 and the floating parts 240 are provided on the same sides of the rectangular frame body part 210, and the restraining part 250 is provided on the different sides. However, without being limited thereto, the floating parts 240 and the restraining part 250 may be provided on the same sides of the frame body part 210, and the connection part 220 may be provided on the different sides, or the connection part 220 and the restraining part 250 may be provided on the same sides of the frame body part 210, and the floating parts 240 may be provided on the different sides.

In the present embodiment, the connector 3 is connected to the plug 102. However, without being limited thereto, the connector 3 may be connected to a mating conductor other than the plug 102.

Fourth Embodiment

<Configuration of Connector>

The configuration of a connector 4 according to a fourth embodiment of the present invention will be described in detail below with reference to FIGS. 24 to 28.

The connector 4 according to the present embodiment is formed, as a single unit, by a metal plate, and is mounted on the mounting surface 100*a* of the circuit substrate 100 so as to connect the conductive part 101 of the circuit substrate 100 to the plug 102, which serves as a mating conductor. Specifically, the connector 4 includes a frame body part 310, a connection part 320, fixed parts 330, floating parts 340, a restraining part 350, and a buckling suppression part 360.

The frame body part 310 has a frame shape that is rectangular as viewed from above. The frame body part 310 includes a lower-end aperture edge part 311 provided around a lower aperture part 313, an upper-end aperture edge part 312 provided around an upper aperture part 314, the lower aperture part 313, the upper aperture part 314, a pair of sidewall parts 316 that are first sidewall parts facing each other, and a pair of sidewall parts 317 that are second sidewall parts facing each other and adjacent to the sidewall parts 316.

The connection part 320 is provided so as to extend from the upper-end aperture edge part 312 of the frame body part 310 toward the inside of the frame body part 310 and toward the lower-end aperture edge part 311. The connection part 320 is provided so as to extend upward from the upper-end aperture edge part 312 and is then folded downward. The connection part 220 has an inverted U-shape that is a U-shape vertically inverted as viewed from the front side. The connection part 320 has upper end portions 321 positioned below the upper-end aperture edge part 312 of the frame body part 310. The connection part 320 is connected to the plug 102.

The connection part 320 is constituted of a connection part 320*a* and a connection part 320*b* that form a pair and face each other. The connection part 320*a* and the connection part 320*b* include contact parts 323 that project inward so as to approach each other and come into contact with the plug 102 within the frame body part 310. A gap between the contact part 323 of the connection part 320*a* and the contact part 323 of the connection part 320*b* is smaller than the diameter of the plug 102. Here, the facing direction of the pair of the connection part 320*a* and the connection part 320*b* is a right-left direction that is identical to the facing direction of the pair of sidewall parts 316.

The fixed parts 330 are positioned below the restraining part 350. The fixed parts 330 are fixed and connected to the conductive part 101 on the mounting surface 100*a* of the circuit substrate 100 by reflow soldering. The fixation and connection of the fixed parts 330 to the conductive part 101 are not limited to the fixation and connection by reflow soldering. The fixed parts 330 may be fixed and connected to the conductive part 101 by other soldering such as flow soldering.

The fixed parts 330 are each constituted of a fixed part 330*a* and a fixed part 330*b* that form a pair. The fixed parts 330*a* are provided as a pair at the front and rear of the connection part 320*a*. The fixed parts 330*b* are provided as a pair at the front and rear of the connection part 320*b*.

The floating parts 340, which connect the frame body part 310 and the fixed part 330, are provided so as to extend downward from the lower-end aperture edge part 311. The floating parts 340 elastically deform so as to support the frame body part 310 so that the frame body part 310 is freely movable along the mounting surface 100*a*.

The floating parts 340 are each constituted of a floating part 340*a* and a floating part 340*b* that form a pair. The floating parts 340*a* are provided as a pair at the front and rear of the connection part 320*a* to connect the lower-end aperture edge part 311 of the frame body part 310 to the fixed parts 330*a*, respectively. The floating parts 340*b* are provided as a pair at the front and rear of the connection part 320*b* to connect the lower-end aperture edge part 311 of the frame body part 310 to the fixed parts 330*b*, respectively.

The restraining part 350 is provided to the frame body part 310. In the state where the connector 4 is mounted on the mounting surface 100*a* of the circuit substrate 100 without the plug 102 being connected to the connection part 320, there is a gap H4 (see FIG. 26) between the restraining part 350 and the mounting surface 100*a*. When the frame body part 310 moves downward, the restraining part 350 comes into contact with the circuit substrate 100 and thereby restrain movement of the frame body part 310 in the downward direction that is the mounting direction, the direction in which the connector 4 is mounted on the circuit substrate 100. The restraining part 350 is provided on the pair of sidewall parts 317 of the rectangular frame body part 310. The sidewall parts 317 face each other and are also different from the pair of sidewall parts 316 that face each other and that are provided with the connection part 320 and the floating parts 340.

The restraining part 350 is constituted of a restraining part 350*a* and a restraining part 350*b* that form a pair. The restraining part 350*a* is formed by making part of the frame body part 310 extend downward from the lower-end aperture edge part 311 and folding, approximately 90 degrees forward, distal end portions in the extending direction. The restraining part 350*b* is provided as a pair across a metal plate seam 4*a* formed when a metal plate is folded and formed into the connector 4. The restraining part 350*b* is formed by making part of the frame body part 310 extend downward from the lower-end aperture edge part 311 and folding, approximately 90 degrees backward, distal end portions in the extending direction.

The buckling suppression part 360, which is U-shaped as viewed from the front side, is provided so as to extend from the lower-end aperture edge part 311 of the frame body part 310 toward the inside of the frame body part 310 and toward the upper-end aperture edge part 312. The buckling suppression part 360 is constituted of a buckling suppression part 360*a* and a buckling suppression part 360*b* that form a pair. The buckling suppression part 360 includes wall parts 361, fold-back parts 362, guard parts 363, window hole parts 364, and folded parts 365.

The wall parts 361 are provided so as to extend downward from the lower-end aperture edge part 311 of the frame body part 310.

The fold-back parts 362 are formed by folding back the lower end of the wall parts 361 upward. The length of the fold-back parts 362 in the front-rear direction that is the plate width direction is shorter than the length of the wall parts 361 in the front-rear direction.

The guard parts 363 are provided above the upper end portions of the fold-back parts 362. The guard parts 363, which face the connection part 320, come into contact with the connection part 320 to restrain urging force in the facing direction between the connection part 320*a* and the connection part 320*b*.

The guard part 363 of the buckling suppression part 360*a* covers the right side of the lower end portion of the connection part 320*a*. The guard part 363 of the buckling suppression part 360*b* covers the left side of the lower end portion of the connection part 320*b*.

The window holes 364, which are provided in the guard parts 363, are through holes passing in a plate thickness direction. Through the window holes 364, the contact parts 323 of the connection part 320 are projected and exposed in projecting directions of the contact parts 323.

The folded parts 365 are each formed by folding a front end portion and a rear end portion of the corresponding guard part 363 approximately 90 degrees outward in the right-left direction. The folded parts 365 also surround the connection part 320 together with the guard parts 363.

The folded part 365 of the buckling suppression part 360*a* covers the front and rear sides of the lower end portion of the connection part 320*a*. The folded part 365 of the buckling suppression part 360*b* covers the front and rear sides of the lower end portion of the connection part 320*b*.

The connector 4 with the above-described configuration is formed by performing folding processing, with a jig, on the metal plate, after the plate is punched out. As a result, the seam 4*a* is produced.

<Method of Mounting Connector on Circuit Substrate>

A method of mounting the connector 4 on the circuit substrate 100 according to the fourth embodiment of the present invention will be described in detail below with reference to FIGS. 24 to 29.

First, the connector 4 is mounted on the mounting surface 100*a* of the circuit substrate 100 from above so that the fixed parts 330 come into contact with the conductive part 101 of the circuit substrate 100.

Then, the fixed parts 330 are connected and fixed to the conductive part 101 of the circuit substrate 100 by reflow soldering, so that the connector 4 is mounted on the mounting surface 100*a* of the circuit substrate 100. Note that the circuit substrate 100 has an unillustrated insertion hole 100*b* formed below the connection part 320.

Since the fixed parts 330 are provided below the restraining part 350, the fixed parts 330 are positioned more on the distal-end side (the lower side) than the restraining part 350 in the downward direction that is the mounting direction. Accordingly, when the connector 4 is mounted on the mounting surface 100*a*, there is a gap between the restraining part 350 and the mounting surface 100*a*. This gap makes it possible to prevent the restraining part 350 from coming into contact with the mounting surface 100*a* before the fixed parts 330 come into contact with the conductive part 101. As a result, connection of the fixed parts 330 to the conductive part 101 can be ensured.

Note that the number of the connectors 4 mounted on the circuit substrate 100 is not limited to one, and may be two or more as necessary. In this case, when two or more plugs 102 are collectively connected to two or more connectors 4, the displacement of the respective plugs 102 with respect to the respective connectors 4 may increase. As a solution, providing the configuration of the present embodiment can stabilize the connection between the respective connection parts 320 and the respective plugs 102.

<Operation of Connector>

The operation of the connector 4 according to the fourth embodiment of the present invention will be described in detail below with reference to FIGS. 24 to 29.

The plug 102 is inserted into and removed from the connector 4 mounted on the mounting surface 100*a* of the circuit substrate 100. First, in the case of inserting the plug 102 into the connector 4 to achieve connection therebetween, the plug 102 is inserted to the lower aperture part 313 of the frame body part 310 of the connector 4, which is mounted on the circuit substrate 100, from below.

Then, the contact parts 323 of the connection part 320 come into contact with the plug 102 that is inserted to the lower aperture part 313 of the frame body part 310 from below, and thereby elastically deform outward in the right-left direction. In this instance, the lower end portions of the connection part 320 are covered with the guard parts 363 of the buckling suppression part 360, so that buckling of the connection part 320 by the plug 102 can be prevented.

Next, the connection part 320 pinches the plug 102 from the left and right sides by its own elastic recovery force and connects to the plug 102.

In this case, when the plug 102 is in a displaced state, the connection part 320 elastically deforms, and the frame body part 310 elastically deforms with the elastic deformation of the connection part 320. As a result, the connection part 320 further presses the sidewall parts 316 from the inside, and the frame body part 310 elastically deforms, so that a load is applied to the floating parts 340 via the connection part 320, the buckling suppression part 360, and the frame body part 310. With the application of the load, the floating parts 340 elastically deform and move the frame body part 310 in a load application direction. When the frame body part 310 moves in the load application direction, the connection part 320 can maintain the connection state to the plug 102 provided in the case where the plug 102 is not displaced with respect to the connector 4. As a result, a stable connection to the plug 102 is achieved.

For example, when the plug 102 is connected to the connection part 320 in the state of being inclined to the right with respect to the up-down direction, the plug 102 presses the connection part 320*b* in an obliquely lower right direction, so that the connection part 320*b* elastically deforms, and the plug 102 also presses the guard parts 363 of the buckling suppression part 360 in the obliquely lower right direction, so that the buckling suppression part 360 elastically deforms. As a result, the folded parts 365 press the frame body part 310 from the inside in the obliquely lower right direction. The floating parts 340 elastically deform by receiving the load applied when the frame body part 310 is pressed in the obliquely lower right direction, and moves the frame body part 310 in the obliquely lower right direction that is the pressing direction of the folded parts 365. When the frame body part 310 moves in the load application direction, the connection part 320 can suppress application of an excessive load to the connection part 320*b* and also suppress reduction of the contact pressure between the plug 102 and the connection part 320*a*. The connection part 320 can also maintain the connection state to the plug 102 provided in the case where the plug 102 is not displaced with respect to the connector 4, so that the connector 4 can stably connect to the plug 102.

Since the floating parts 340 are provided so as to extend from the sidewall parts 316 that face each other in the facing direction in which the connection part 320*a* and the connection part 320*b* face each other, it is possible to improve the followability of the elastic deformation of the floating parts 340 with respect to the elastic deformation of the connection part 320 caused by the displacement of the plug 102. Since the floating parts 340 are provided so as to extend from the sidewall parts 316 that are pressed by the connection part 320, it is possible to improve the followability of the elastic deformation of the floating parts 340 with respect to the pressing force applied from the connection part 320 to the sidewall parts 316 due to the displacement of the plug 102.

In the above-described operation, since the lower end portions of the connection part 320 are covered with the guard parts 363, it is possible to prevent buckling and deformation of the connection part 320 at the time of connection between the connection part 320 and the plug 102.

In the case where the connection part 320 presses the frame body part 310 as well as in the case where the connection part 320 does not press the frame body part 310, the floating parts 340 elastically deform in accordance with the pressing force that the connection part 320 receives from the plug 102. Therefore, the frame body part 310 can behave in a similar manner as described above, so that the connection part 320 can stably connect to the plug 102.

Even in the case where a load, due to some external force, is applied after the connection part 320 and the plug 102 are connected to each other, the connector 4 can still perform the same operation that is performed when a load is applied at the time when the connection part 320 and the plug 102 are connected to each other.

To cancel the connection between the connector 4 and the plug 102, the plug 102 is pulled downward. As a result, the floating parts 340 return to the state before connection to the plug 102 by their own elastic recovery force, and the frame body part 310 accordingly returns to the state before connection to the plug 102.

At that time, when the connection part 320 is pulled downward by the plug 102 and the frame body part 310 consequently moves downward following the connection part 320, the restraining part 350 comes into contact with the mounting surface 100*a* of the circuit substrate 100 to restrain the downward movement of the connector 4. This restraint makes it possible to prevent buckling and plastic deformation of the floating parts 340.

Moreover, the restraining part 350 is provided on the sidewall parts 317 of the rectangular frame body part 310, which are different from the sidewall parts 316 where the connection part 320 and the floating parts 340 are provided. This arrangement makes it possible to increase the width of the restraining part 350 in the right-left direction and to increase the area of contact with the mounting surface 100*a*, so that the movement of the connector 4 and the frame body part 310 can reliably be restrained.

Thus, according to the present embodiment, the connector 4 includes: the pair of connection parts 320*a* and 320*b* that are provided so as to extend from the upper-end aperture edge part 312 of the frame body part 310 toward the inside of the frame body part 310 and toward the lower-end aperture edge part 311 and to be connected to the plug 102; the pair of fixed parts 330*a* and 330*b* that are fixed and connected to the conductive part 101; the buckling suppression part 360 constituted of the pair of buckling suppression parts 360*a* and 360*b* that are provided so as to extend from the lower-end aperture edge part 311 of the frame body part 310 to the inside of the frame body part 310 and cover the distal-end portions of the connection part 320 in the extending direction; and the pair of floating parts 340*a* and 340*b* that connect the lower-end aperture edge part 311 to the pair of fixed parts 330*a* and 330*b*, respectively, and support the frame body part 310 so that the frame body part 310 is freely movable. Accordingly, even when displacement of the plug 102 occurs when the connection is being established or after the establishment of a connection to the plug 102, it is possible to maintain an electrically stable connection.

In the present embodiment, the connection part 320 and the floating parts 340 are provided on the same sides of the rectangular frame body part 310, and the restraining part 350 is provided on the different sides. However, without being limited thereto, the floating parts 340 and the restraining part 350 may be provided on the same sides of the frame body part 310, and the connection part 320 may be provided on the different sides, or the connection part 320 and the restraining part 350 may be provided on the same sides of the frame body part 310, and the floating parts 340 may be provided on the different sides.

In the present embodiment, the connector 4 is connected to the plug 102. However, without being limited thereto, the connector 4 may be connected to a mating conductor other than the plug 102.

Fifth Embodiment

<Configuration of Connector>

The configuration of a connector 5 according to a fifth embodiment of the present invention will be described in detail below with reference to FIGS. 30 to 36.

The connector 5 according to the present embodiment is formed, as a single unit, by a metal plate, and is mounted on the mounting surface 100*a* of the circuit substrate 100 so as to connect the conductive part 101 of the circuit substrate 100 to the plug 102. Specifically, the connector 5 includes a frame body part 410, a connection part 420, fixed parts 430, floating parts 440, and a restraining part 450.

The frame body part 410 has a frame shape that is rectangular as viewed from above. The frame body part 410 includes a lower-end aperture edge part 411 provided around a lower aperture part 413, an upper-end aperture edge part 412 provided around an upper aperture part 414, the lower aperture part 413, the upper aperture part 414, a pair of sidewall parts 416 that are first sidewall parts facing each other, and a pair of sidewall parts 417 that are second sidewall parts facing each other and adjacent to the sidewall parts 416. The sidewall parts 416 include receiving parts 4161 that can be pressed directly by the elastically deformable connection part 420 from the inside. The receiving parts 4161 each have a recessed groove part 4162 formed inwardly along the up-down direction by bead machining.

The connection part 420 is provided so as to extend from the lower-end aperture edge part 411 of the frame body part 410 toward the inside of the frame body part 410 and toward the upper-end aperture edge part 412. The connection part 420 has upper end portions 421 positioned below the upper-end aperture edge part 412 of the frame body part 410. The connection part 420 is connected to the plug 102, and when the connection part 420 is not connected to the plug 102, there is a gap between the connection part 420 and the frame body part 410.

The connection part 420 is constituted of a connection part 420*a* and a connection part 420*b* that form a pair and face each other. The connection part 420*a* and the connection part 420*b* are facing surfaces that face each other and each include a groove part 422 provided so as to be recessed downward from an upper end portion 421 at a central part in a front-rear direction that is a plate width direction. The connection part 420*a* and the connection part 420*b* include contact parts 423 that project inward so as to approach each other and come into contact with the plug 102 within the frame body part 410. A gap between the contact part 423 of the connection part 420*a* and the contact part 423 of the connection part 420*b* is smaller than the diameter of the plug 102. Here, the facing direction of the pair of the connection part 420*a* and the connection part 420*b* is a right-left direction that is identical to the facing direction of the pair of sidewall parts 416.

The fixed parts 430 are positioned above the restraining part 450. The fixed parts 430 each have a notch part 431. The fixed parts 430 are fixed and connected to the conductive part 101 on the mounting surface 100*a* of the circuit substrate 100 by reflow soldering. The fixation and connection of the fixed parts 430 to the conductive part 101 are not limited to the fixation and connection by reflow soldering. The fixed parts 430 may be fixed and connected to the conductive part 101 by other soldering such as flow soldering.

The fixed parts 430 are each constituted of a fixed part 430*a* and a fixed part 430*b* that form a pair. The fixed parts 430*a* are provided as a pair at the front and rear of the connection part 420*a*. The fixed parts 430*b* are provided as a pair at the front and rear of the connection part 420*b*.

The floating parts 440 connect the frame body part 410 and the fixed parts 430. The floating parts 440, which are provided so as to extend forward or backward from the upper-end aperture edge part 412, are provided so as to be curved in a zigzag shape and an S-shape on the same planes as the side wall parts 416 of the frame body part 410. The floating parts 440 elastically deform so as to support the frame body part 410 so that the frame body part 410 is freely movable along the mounting surface 100*a*.

The floating parts 440 are each constituted of a floating part 440*a* and a floating part 440*b* that form a pair. The floating parts 440*a* are provided as a pair at the front and rear of the connection part 420*a* to connect the upper-end aperture edge part 412 of the frame body part 410 to the fixed parts 430*a*, respectively. The floating parts 440*b* are provided as a pair at the front and rear of the connection part 420*b* to connect the upper-end aperture edge part 412 of the frame body part 410 to the fixed parts 430*b*, respectively.

The restraining part 450 is provided to the frame body part 410. In the state where the connector 5 is mounted on the mounting surface 100*a* of the circuit substrate 100 without the plug 102 being connected to the connection part 420, there is a gap H5 between the restraining part 450 and the mounting surface 100*a*. When the frame body part 410 moves upward while the connector 5 is mounted on the mounting surface 100*a* of the circuit substrate 100, the restraining part 450 comes into contact with the circuit substrate 100 and thereby restrain movement of the frame body part 410 in an upward direction that is the mounting direction, the direction in which the connector 5 is mounted on the circuit substrate 100. The restraining part 450 is provided on the pair of sidewall parts 417 of the rectangular frame body part 410. The sidewall parts 417 face each other and are also different from the pair of sidewall parts 416 that face each other and that are provided with the connection part 420 and the floating parts 440.

The restraining part 450 is constituted of a restraining part 450*a* and a restraining part 450*b* that form a pair. The restraining part 450*a* is formed by folding part of the frame body part 410 approximately 90 degrees forward from the lower-end aperture edge part 411. The restraining part 450*b* is provided as a pair across a metal plate seam 5*a* formed when a metal plate is folded and formed into the connector 5. The restraining part 450*b* is formed by folding part of the frame body part 410 approximately 90 degrees backward from the lower-end aperture edge part 411.

In the connector 5 with the aforementioned configuration, a length L43 of the floating parts 440 in the plate width direction is shorter than a length L44 of the connection part 420 in the plate width direction (L43<L44). Furthermore, since the fixed parts 430 project forward from the front end or project backward from the rear end of the floating parts 440, the length L45 of the fixed parts 430 in the plate width direction is longer than the length L43 of the floating parts 440 in the plate width direction (L43<L45).

In addition, the connector 5 is formed by performing folding processing, with a jig, on the metal plate, after the plate is punched out. As a result, the seam 5*a* is produced.

<Method of Mounting Connector on Circuit Substrate>

A method of mounting the connector 5 on the circuit substrate 100 according to the fifth embodiment of the present invention will be described in detail below with reference to FIGS. 30 to 36.

The circuit substrate 100 includes the conductive part 101 of a circuit pattern around an insertion hole 100*b* of the mounting surface 100*a*.

First, the circuit substrate 100 is vertically inverted so that the mounting surface 100*a* is on the upper side, and the connector 5 is vertically inverted so that the upper-end aperture edge part 412 of the frame body part 10 is on the lower side.

Next, the vertically inverted connector 5 is mounted on the mounting surface 100*a* of the vertically inverted circuit substrate 100 from above so that the fixed parts 430 come into contact with the conductive part 101 of the circuit substrate 100.

Then, the fixed parts 430 are connected and fixed to the conductive part 101 of the circuit substrate 100 by reflow soldering, so that the connector 5 is mounted on the mounting surface 100*a* of the circuit substrate 100. At that time, since the notch parts 431 are provided to the fixed parts 430, it is possible to visually inspect the reflow soldering through the notch parts 431, so that soldering defects can be reduced. Note that the circuit substrate 100 has an unillustrated insertion hole 100*b* formed below the connection part 420 constituted of the pair of connection parts 420*a* and 420*b*.

Then, after the connector 5 is mounted on the mounting surface 100*a* of the circuit substrate 100, the connector 5 and the circuit substrate 100 are vertically inverted into their original state.

Since the fixed parts 430 are provided above the restraining part 450, the fixed parts 430 are positioned more on a distal-end side (an upper side) than the restraining part 450 in the upward direction that is the mounting direction in the case where the vertical inversion is not performed. Accordingly, when the connector 5 is mounted on the mounting surface 100*a*, there is a gap H5 between the restraining part 450 and the mounting surface 100*a*. This gap makes it possible to prevent the restraining part 450 from coming into contact with the mounting surface 100*a* before the fixed parts 430 come into contact with the conductive part 101. As a result, connection of the fixed parts 430 to the conductive part 101 can be ensured.

In addition, the floating parts 440 are provided on the same planes as the sidewall parts 416 of the frame body part 410, so that the mounting area of the connector 5 on the circuit substrate 100 can be reduced.

Furthermore, since the floating parts 440 are curved in a zigzag shape or an S-shape on the same planes as the sidewall parts 416 of the frame body part 410, it is possible to lower the height of the connector 5 while maintaining the desired amount of elastic deformation of the floating parts 440.

Note that the number of the connectors 5 mounted on the circuit substrate 100 is not limited to one, and may be two or more as necessary. In this case, when two or more plugs 102 are collectively connected to two or more connectors 5, the displacement of the respective plugs 102 with respect to the respective connectors 5 may increase. As a solution, providing the configuration of the present embodiment can stabilize the connection between the respective connection parts 420 and the respective plugs 102.

<Operation of Connector>

The operation of the connector 5 according to the fifth embodiment of the present invention will be described in detail below with reference to FIGS. 30 to 36.

The plug 102 is inserted into and removed from the connector 5 mounted on the mounting surface 100*a* of the circuit substrate 100. First, in the case of inserting the plug 102 into the connector 5 to achieve connection therebetween, the plug 102 is inserted to the lower aperture part 413 of the frame body part 410 of the connector 5, which is mounted on the mounting surface 100*a* of the circuit substrate 100, from below.

Then, the contact parts 423 of the connection part 420 come into contact with the plug 102 that is inserted to the lower aperture part 413 from below, and thereby elastically deform outward in the right-left direction.

At that time, when the connection part 420 is pulled upward by the plug 102 and the frame body part 410 consequently moves upward following the connection part 420, the restraining part 450 comes into contact with the mounting surface 100*a* of the circuit substrate 100 to restrain the upward movement of the connector 5. This restraint makes it possible to prevent buckling and plastic deformation of the floating parts 440.

Moreover, the restraining part 450 is provided on the sidewall parts 417 of the rectangular frame body part 410, which are different from the sidewall parts 416 where the connection part 420 and the floating parts 440 are provided. This arrangement makes it possible to increase the width of the restraining part 450 in the right-left direction and to increase the area of contact with the mounting surface 100*a*, so that movement of the connector 5 and the frame body part 410 can reliably be restrained.

Next, the connection part 420 pinches the plug 102 from the left and right sides by its own elastic recovery force and connects to the plug 102.

In this case, when the plug 102 is in a displaced state, the connection part 420 elastically deforms, and the frame body part 410 elastically deforms with the elastic deformation of the connection part 420. As a result, the connection part 420 further presses the sidewall parts 416 from the inside, and the frame body part 410 elastically deforms, so that a load is applied to the floating parts 440 via the connection part 420 and the frame body part 410. With the application of the load, the floating parts 440 elastically deform and move the frame body part 410 in a load application direction. When the frame body part 410 moves in the load application direction, the connection part 420 can maintain the connection state to the plug 102 provided in the case where the plug 102 is not displaced with respect to the connector 5. As a result, a stable connection to the plug 102 is achieved.

Here, the state where the plug 102 is displaced includes: the states where the plug 102 is displaced, from the position where the plug 102 stably connects to the connection part 420, in the directions parallel to the front, rear, left, and right directions; the state where the plug is inclined in the up-down direction; and combined states of these. The position where the plug 102 stably connects to the connection part 420 is the position where the plug 102 connects to the connection part 420*a* and the connection part 420*b* at a contact pressure of a prescribed value or more and the plug 102 connects to the connection part 420*a* and the connection part 420*b* at substantially the same contact pressure.

Since the floating parts 440 are provided so as to extend from the sidewall parts 416 that face each other in the facing direction in which the connection part 420*a* and the connection part 420*b* face each other, it is possible to improve the followability of the elastic deformation of the floating parts 440 with respect to the elastic deformation of the connection part 420 caused by the displacement of the plug 102. Since the floating parts 440 are provided so as to extend from the sidewall parts 416 that are pressed by the connection part 420, it is possible to improve the followability of the elastic deformation of the floating parts 440 with respect to the pressing force applied from the connection part 420 to the sidewall parts 416 due to the displacement of the plug 102. Furthermore, since the floating parts 440 are provided so as to extend from the receiving parts 4161 of the sidewall parts 416 that are pressed by the connection part 420, it is possible to further improve the followability of the elastic deformation of the floating parts 440 with respect to the elastic deformation of the connection part 420 caused by the displacement of the plug 102. Particularly, when the floating parts 440 are provided so as to extend from contact parts Q that come into contact with the connection part 420, it is possible to further improve the followability of the elastic deformation of the floating parts 440 with respect to the elastic deformation of the connection part 420 caused by the displacement of the plug 102.

Moreover, since the recessed groove parts 4162 are provided in the receiving parts 4161, the strength of the receiving parts 4161 can be enhanced as compared with the case without the recessed groove parts 4162. Therefore, the pressing force from the connection part 420 can be reliably transmitted to the floating parts 440 via the receiving parts 4161.

In the above-described operation, the length L43 of the floating parts 440 in the plate width direction is set shorter than the length L44 of the connection part 420 in the plate width direction, so that the floating parts 440 can be made to deform more easily than the connection part 420. In addition, when the length L44 of the connection part 420 in the plate width direction is set longer than the length L43 of the floating parts 440 in the plate width direction, the connection stability of the connection part 420 can be improved.

Since the upper end portions 421 of the connection part 420 are positioned below the upper-end aperture edge part 412, the connection part 420 can be protected by the frame body part 410, so that deformation of the connection part 420 can be prevented.

In the case where the connection part 420 presses the frame body part 410 as well as in the case where the connection part 420 does not press the frame body part 410, the floating parts 440 elastically deform in accordance with the pressing force that the connection part 420 receives from the plug 102. Therefore, the frame body part 410 can behave in a similar manner as described above, so that the connection part 420 can stably connect to the plug 102.

Even in the case where a load, due to some external force, is applied after the connection part 420 and the plug 102 are connected to each other, the connector 5 can still perform the same operation that is performed when a load is applied at the time when the connection part 420 and the plug 102 are connected to each other.

To cancel the connection between the connector 5 and the plug 102, the plug 102 is pulled downward. As a result, the floating parts 440 return to the state before connection to the plug 102 by their own elastic recovery force, and the frame body part 410 accordingly returns to the state before connection with plug 102.

Thus, according to the present embodiment, the connector 5 includes: the frame-shaped frame body part 410 including the upper aperture part 414, the lower aperture part 413, the upper-end aperture edge part 412 provided around the upper aperture part 414, and the lower-end aperture edge part 411 provided around the lower aperture part 413; the pair of connection parts 420*a* and 420*b* that are provided so as to extend from the lower-end aperture edge part 411 toward the inside of the frame body part 410 and toward the upper-end aperture edge part 412 and to be connected to the plug 102; the pair of fixed parts 430*a* and 430*b* that are fixed and connected to the conductive part 101; and the pair of floating parts 440*a* and 440*b* that connect the frame body part 410 to the pair of fixed parts 430*a* and 430*b*, respectively, and movably support the frame body part 410. Accordingly, even when displacement of the plug 102 occurs when the connection is being established or after the establishment of a connection to the plug 102, it is possible to maintain an electrically stable connection.

In the present embodiment, the floating parts 440 are provided so as to extend from the contact parts Q that come into contact with the connection part 420. However, without being limited thereto, the floating parts 440 may be provided so as to extend from portions of the receiving parts 4161 other than the contact parts Q.

The present invention is not limited to the embodiments described in terms of the types, layouts, the number, or the like, of the component members. It is to be naturally understood that appropriate modifications, such as appropriate substitution of the component members with those providing equivalent effects, are possible within the scope of the appended claims and their equivalents.

INDUSTRIAL APPLICABILITY

The embodiment(s) of the present invention is suitably applicable to a connector to be mounted on a mounting surface of a circuit substrate and formed, as a single unit, by a metal plate that connects a conductive part of the circuit substrate and a mating conductor.

REFERENCES SIGNS LIST

| | |
|---|---|
| 1 | connector |
| 2 | connector |
| 3 | connector |
| 4 | connector |
| 5 | connector |
| 10 | frame body part |
| 11 | lower-end aperture edge part |
| 12 | upper-end aperture edge part |
| 13 | lower aperture part |
| 14 | upper aperture part |
| 15 | notch part |
| 20 | connection part |
| 20a | connection part |
| 20b | connection part |
| 21 | upper end portion |
| 22 | groove part |
| 23 | contact part |
| 30 | fixed part |
| 30a | fixed part |
| 30b | fixed part |
| 40 | floating part |
| 40a | floating part |

-continued

| | |
|---|---|
| 40b | floating part |
| 50 | restraining part |
| 50a | restraining part |
| 50b | restraining part |
| 100 | circuit substrate |
| 100a | mounting surface |
| 100b | insertion hole |
| 100c | inner wall |
| 101 | conductive part |
| 102 | plug |
| 110 | frame body part |
| 120 | connection part |
| 130 | fixed part |
| 140 | floating part |
| 150 | restraining part |
| 210 | frame body part |
| 220 | connection part |
| 230 | fixed part |
| 240 | floating part |
| 250 | restraining part |
| 310 | frame body part |
| 320 | connection part |
| 330 | fixed part |
| 340 | floating part |
| 350 | restraining part |
| 360 | buckling suppression part |
| 360a | buckling suppression part |
| 360b | buckling suppression part |
| 361 | wall part |
| 362 | fold-back part |
| 363 | guard part |
| 364 | window hole part |
| 365 | folded part |
| 410 | frame body part |
| 420 | connection part |
| 430 | fixed part |
| 440 | floating part |
| 450 | restraining part |

CITATION LIST

Patent Literature 1: Japanese Patent Application Laid-Open No. H11-339906

The invention claimed is:

1. A connector to be mounted on a circuit substrate and formed, as a single unit, by a metal plate that connects a conductive part of the circuit substrate and a mating conductor, the connector comprising:

a frame-shaped frame body part including an upper aperture part, a lower aperture part, an upper-end aperture edge part provided around the upper aperture part, and a lower-end aperture edge part provided around the lower aperture part;

a pair of connection parts provided so as to extend from the lower-end aperture edge part toward an inside of the frame body part and toward the upper-end aperture edge part and to be connected to the mating conductor;

a pair of fixed parts that are fixed and connected to the conductive part; and a pair of floating parts that connect the frame body part to the pair of fixed parts, respectively, and movably supports the frame body part;

wherein the frame body part includes a pair of sidewall parts that face each other in a facing direction in which the connection parts face each other;

each of the floating parts is provided to extend from each of the sidewall parts; and each of the floating parts is provided on the same plane as each of the sidewall parts.

2. The connector according to claim 1, wherein:

the pair of connection parts elastically deform when the connecter is being connected to the mating conductor or after the connection is established to be capable of pressing the sidewall parts from inside; and the pair of floating parts elastically deforms when the pair of connection parts presses the pair of sidewall parts to be capable of moving the frame body part in a pressing direction.

3. The connector according to claim 2, wherein each of the floating parts is provided to extend from contact parts of the connection parts that come into contact with the sidewall parts.

4. The connector according to claim 1, wherein each of the floating parts connects the upper-end aperture edge part to each of the fixed parts.

5. The connector according to claim 1, wherein each of the floating parts connects the lower-end aperture edge part to each of the fixed parts.

6. The connector according to claim 1, comprising a restraining part that is provided to the frame body part, wherein the restraining part is configured to come into contact with the circuit substrate and thereby restrain movement of the frame body part in a mounting direction, the direction in which the connector is mounted on the circuit substrate.

7. The connector according to claim 6, wherein each of the fixed parts is positioned more on a distal-end side than the restraining part.

8. The connector according to claim 6, wherein:

the floating parts connect the respective fixed parts to first sidewall parts of the frame body part, the first sidewall parts facing each other; and the restraining part is provided to second sidewall parts of the frame body part, the second sidewall parts being different from the first sidewall parts.

9. The connector according to claim 1, wherein a length of each of the floating parts in a plate width direction is shorter than a length of each of the connection parts in the plate width direction.

10. The connector according to claim 1, wherein the upper-end aperture edge part is positioned above the upper end portions of the connection parts.

11. The connector according to claim 1, wherein a gap is formed between the pair of connection parts and the frame body part when the connection parts are not connected to the mating conductor.

12. The connector according to claim 1, wherein:

each of the connection parts is provided so as to extend downward from the lower-end aperture edge part and is then folded upward;

each of the floating parts is provided so as to extend downward from the lower-end aperture edge part and is then folded upward to be connected to each of the fixed parts; and a length between the lower-end aperture edge part and a lower end portion of each of the floating parts is longer than a length between the lower-end aperture edge part and a lower end portion of each of the connection parts.

13. The connector according to claim 1, wherein each of the fixed parts is connected to a lower end portion of each of the floating parts; and each of the floating parts includes an inwardly suspended part provided so as to extend downward from the lower-end aperture edge part, a folded part folded outward from a lower end portion of the inwardly suspended part, and an outwardly suspended part provided so as to extend downward from an outer end portion of the folded part and to be connected to each of the fixed parts.

14. A connector to be mounted on a circuit substrate and formed, as a single unit, by a metal plate that connects a conductive part of the circuit substrate and a mating conductor, the connector comprising:

a frame-shaped frame body part including an upper aperture part, a lower aperture part, an upper-end aperture edge part provided around the upper aperture part, and a lower-end aperture edge part provided around the lower aperture part;

a pair of connection parts provided so as to extend from the upper-end aperture edge part toward an inside of the frame body part and toward the lower-end aperture edge part and to be connected to the mating conductor;

a pair of fixed parts that are fixed and connected to the conductive part;

a pair of buckling suppression parts provided so as to extend from the lower-end aperture edge part toward an inside of the frame body part and toward the upper-end aperture edge part and to cover a lower end portion of the pair of connection parts; and a pair of floating parts that connect the lower-end aperture edge part with the pair of fixed parts, respectively, and movably support the frame body part.

15. A connector to be mounted on a circuit substrate and formed, as a single unit, by a metal plate that connects a conductive part of the circuit substrate and a mating conductor, the connector comprising:

a frame-shaped frame body part including an upper aperture part, a lower aperture part, an upper-end aperture edge part provided around the upper aperture part, and a lower-end aperture edge part provided around the lower aperture part;

a pair of connection parts provided so as to extend from the lower-end aperture edge part toward an inside of the frame body part and toward the upper-end aperture edge part and to be connected to the mating conductor;

a pair of fixed parts that are fixed and connected to the conductive part; and a pair of floating parts that connect the frame body part to the pair of fixed parts, respectively, and movably supports the frame body part;

wherein:

each of the connection parts is provided so as to extend downward from the lower-end aperture edge part and is then folded upward;

each of the floating parts is provided so as to extend downward from the lower-end aperture edge part and is then folded upward to be connected to each of the fixed parts; and a length between the lower-end aperture edge part and a lower end portion of each of the floating parts is longer than a length between the lower-end aperture edge part and a lower end portion of each of the connection parts.

* * * * *